US010420088B2

(12) United States Patent
Ang et al.

(10) Patent No.: US 10,420,088 B2
(45) Date of Patent: Sep. 17, 2019

(54) DOWNLINK SLOT STRUCTURE, CHANNEL PLACEMENT, AND PROCESSING TIMELINE OPTIONS

(71) Applicant: QUALCOMM Incorporated, San Diego, CA (US)

(72) Inventors: Peter Pui Lok Ang, San Diego, CA (US); Tao Luo, San Diego, CA (US); Krishna Kiran Mukkavilli, San Diego, CA (US); June Namgoong, San Diego, CA (US); Yang Yang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 15/613,014

(22) Filed: Jun. 2, 2017

(65) Prior Publication Data
US 2017/0353947 A1    Dec. 7, 2017

Related U.S. Application Data

(60) Provisional application No. 62/346,284, filed on Jun. 6, 2016.

(51) Int. Cl.
*H04W 72/04*    (2009.01)
*H04B 7/0413*    (2017.01)
(Continued)

(52) U.S. Cl.
CPC ........ *H04W 72/042* (2013.01); *H04B 7/0413* (2013.01); *H04L 5/0044* (2013.01);
(Continued)

(58) Field of Classification Search
CPC ... H04L 5/0048; H04L 5/0007; H04L 5/0051; H04L 5/0053; H04L 5/0035; H04L 5/005;
(Continued)

(56) References Cited

U.S. PATENT DOCUMENTS

2017/0318564 A1* 11/2017 Lee ........................... H04L 1/00
2018/0206129 A1* 7/2018 Choi ......................... H04L 1/00

OTHER PUBLICATIONS

International Search Report and Written Opinion—PCT/US2017/035996—ISA/EPO—dated Nov. 30, 2017.
(Continued)

*Primary Examiner* — Awet Haile
(74) *Attorney, Agent, or Firm* — Loza & Loza, LLP

(57) ABSTRACT

Aspects of the disclosure provide a slot structure (e.g., the arrangement of channels and pilot signals within a slot) that can relax the processing timeline for a wireless communication device. For example, in the first or initial symbol of a slot, control information may be frequency division multiplexed (FDM) with a demodulation reference signal (DMRS) or with user data. In some cases, delayed-processing data may be sampled, and the samples may be buffered at the receiving device, for processing later, after control information needed to process the data has been received and processed. Further aspects provide for payload pre-tapering. That is, when a device delays the processing of data bits, this can cause a processing bottleneck after that buffering delay. By virtue of various pre-tapering techniques described herein, the processing load needed to process the delayed-processing data can be reduced. Other aspects, embodiments, and features are also claimed and described.

56 Claims, 21 Drawing Sheets

(51) Int. Cl.
*H04L 5/00* (2006.01)
*H04W 72/12* (2009.01)

(52) U.S. Cl.
CPC .......... *H04L 5/0048* (2013.01); *H04L 5/0053* (2013.01); *H04L 5/0055* (2013.01); *H04W 72/0446* (2013.01); *H04W 72/12* (2013.01); *H04L 5/0007* (2013.01)

(58) Field of Classification Search
CPC . H04L 5/0023; H04L 27/2613; H04L 5/0044; H04L 5/0094; H04L 5/0055; H04L 1/1861; H04L 27/261; H04L 1/1854; H04L 1/1887; H04L 25/0222; H04L 27/2601; H04L 41/0896; H04L 5/023; H04L 5/14; H04W 72/042; H04W 72/0446; H04W 72/0413; H04W 16/14; H04W 24/10; H04W 72/04

See application file for complete search history.

(56) References Cited

OTHER PUBLICATIONS

Qualcomm Incorporated: "Frame Structure Requirements", 3GPP DRAFT; R1-162206, 3rd Generation Partnership Project (3GPP), Mobile Competence Centre, 650, Route Des Lucioles, F-06921, Sophia-Antipolis Cedex, France, vol. RAN WG1, No. Busan, Korea; Apr. 2, 2016, XP051080034, Retrieved from the Internet: URL:http://www.3gpp.org/ftp/tsg_ran/WG1_RL1/TSGR1_84b/Docs [retrieved on Apr. 2, 2016], 9 pages.

Fujitsu: "NR Frame Structure Considerations for Low Latency TDD Operation", 3GPP TSG RAN WG1 Meeting #85, R1-164332, May 13, 2016, XP051090159, Retrieved from the Internet: URL:http://www.3gpp.org/ftp/tsg_ran/WG1_RL1/TSGR1_85/Docs/, 4 pages.

Huawei et al., "Discussion on Frame Structure for NR", 3GPP TSG RAN WG1 Meeting #85, R1-164032, May 15, 2016, XP051089779, Retrieved from the Internet: URL:http://www.3gpp.org/ftp/tsg_ran/WG1_RL1/TSGR1_85/Docs/, 8 pages.

Huawei et al., "sPDCCH design for short TTI", 3GPP TSG RAN WG1 Meeting #85, R1-164059, May 14, 2016, XP051096625, Retrieved from the Internet: URL: http://www.3gpp.org/ftp/tsg_ran/WG1_RL1/TSGR1_85/Docs/, 6 pages.

Nokia et al., "Main Components for Forward Compatible Frame Structure Design in NR", 3GPP TSG-RAN WG1 #85, R1-165029, May 13, 2016, XP051096684, Retrieved from the Internet: URL:http://www.3gpp.org/ftp/tsg_ran/WG1_RL1/TSGR1_85/Docs/, 5 pages.

Partial International Search Report—PCT/US2017/035996—ISA/EPO—dated Aug. 14, 2017.

* cited by examiner

MIMO

OFDM

Scalable Numerology

Self-Contained Slots

Single-Interlace Operation

DOWNLINK SLOT STRUCTURE, CHANNEL PLACEMENT, AND PROCESSING TIMELINE OPTIONS

CROSS-REFERENCE TO RELATED APPLICATIONS

The present Application for Patent claims priority to U.S. Provisional Application No. 62/346,284, titled "DOWNLINK SUBFRAME STRUCTURE, CHANNEL PLACEMENT, AND PROCESSING TIMELINE OPTIONS" filed Jun. 6, 2016, and assigned to the assignee hereof and hereby expressly incorporated by reference herein as if fully set forth below and for all applicable purposes.

TECHNICAL FIELD

The technology discussed below relates generally to wireless communication systems, and more particularly, to a subframe structure for a downlink subframe. Embodiments can provide and enable techniques for managing a processing timeline at a device receiving the downlink subframe.

INTRODUCTION

In a wireless communication network that uses scheduled resources, certain downlink control information may be carried from a scheduling entity to user devices on a control channel. For example, the downlink control information may include information utilized by the user device to identify its resources, where to receive user data, and how to decode it. In addition to the resource assignment, the downlink control information may further include information about the modulation and coding scheme and hybrid ARQ protocol, and retransmission indicators (RI) indicating whether the current transmission is a retransmission.

In new and forthcoming wireless communication systems, to enable a large variety of modes of communication, it is desired to reduce communication latency as much as possible. To this end, the communication channel placement within the downlink carrier may be configured to optimize a processing timeline at the receiving device.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Some aspects of the disclosure relate to wireless communication in a network having low latency requirements. In many cases, to provide for very low latency, a flexible or scalable numerology may be utilized, wherein the duration of individual symbols may be quite small, making a very short time available for a device to receive and process the information before that device must generate and transmit a response. This short turnaround time can strain the processing resources in a wireless communication device.

Accordingly, various aspects of the present disclosure provide for a slot structure (e.g., the arrangement of channels and pilot signals within a slot) that can relax the processing timeline for a wireless communication device. For example, in the first or initial symbol of a slot, control information may be frequency division multiplexed (FDM) with a demodulation reference signal (DMRS) or with user data. In some cases, delayed-processing data may be sampled, and the samples may be buffered at the receiving device, for processing later, after control information needed to process the data has been received and processed.

Further aspects of the disclosure provide for payload pre-tapering. That is, when a device delays the processing of data bits, this can cause a processing bottleneck after that buffering delay. By virtue of various pre-tapering techniques described herein, the processing load needed to process the delayed-processing data can be reduced.

In one example, the disclosure provides a method for a scheduled entity to communicate wirelessly with a scheduling entity. In this example, the method includes receiving a downlink transmission, wherein a first slot of the downlink transmission includes a first control region configured to carry first downlink control information (DCI) and a control reference signal (CRS), a first data region multiplexed with the first control region and configured to carry first user data and a first demodulation reference signal (DMRS), and at least one of a second data region configured to carry second user data, or a second DMRS, frequency-division multiplexed (FDM) with the first control region. The method further includes transmitting, in an uplink burst region of the first slot, feedback based on at least one of the first DCI, the first user data, the second user data, the first DMRS, or the second DMRS, of the first slot.

In another example, the disclosure provides a scheduled entity configured for wireless communication with a scheduling entity. In this example, the scheduled entity includes a processor, a transceiver communicatively coupled to the processor, and a memory communicatively coupled to the processor. The processor is configured for receiving a downlink transmission, wherein a first slot of the downlink transmission includes a first control region configured to carry first downlink control information (DCI) and a control reference signal (CRS), a first data region multiplexed with the first control region and configured to carry first user data and a first demodulation reference signal (DMRS), and at least one of a second data region configured to carry second user data, or a second DMRS, frequency-division multiplexed (FDM) with the first control region. The processor is further configured for transmitting, in an uplink burst region of the first slot, feedback based on at least one of the first DCI, the first user data, the second user data, the first DMRS, or the second DMRS, of the first slot.

In another example, the disclosure provides a scheduled entity configured for wireless communication with a scheduling entity. In this example, the scheduled entity includes means for receiving a downlink transmission, wherein a first slot of the downlink transmission includes a first control region configured to carry first downlink control information (DCI) and a control reference signal (CRS), a first data region multiplexed with the first control region and configured to carry first user data and a first demodulation reference signal (DMRS), and at least one of a second data region configured to carry second user data, or a second DMRS, frequency-division multiplexed (FDM) with the first control region. The scheduled entity further includes means for transmitting, in an uplink burst region of the first slot, feedback based on at least one of the first DCI, the first user data, the second user data, the first DMRS, or the second DMRS, of the first slot.

In another example, the disclosure provides a computer readable medium storing computer executable code, including instructions for causing a scheduled entity to receive a downlink transmission from a scheduling entity. In this example, a first slot of the downlink transmission includes a first control region configured to carry first downlink control information (DCI) and a control reference signal (CRS), a first data region multiplexed with the first control region and configured to carry first user data and a first demodulation reference signal (DMRS), and at least one of a second data region configured to carry second user data, or a second DMRS, frequency-division multiplexed (FDM) with the first control region. The computer executable code further includes instructions for causing the scheduled entity to transmit, in an uplink burst region of the first slot, feedback based on at least one of the first DCI, the first user data, the second user data, the first DMRS, or the second DMRS, of the first slot.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Radio Access Network

Figure 1:
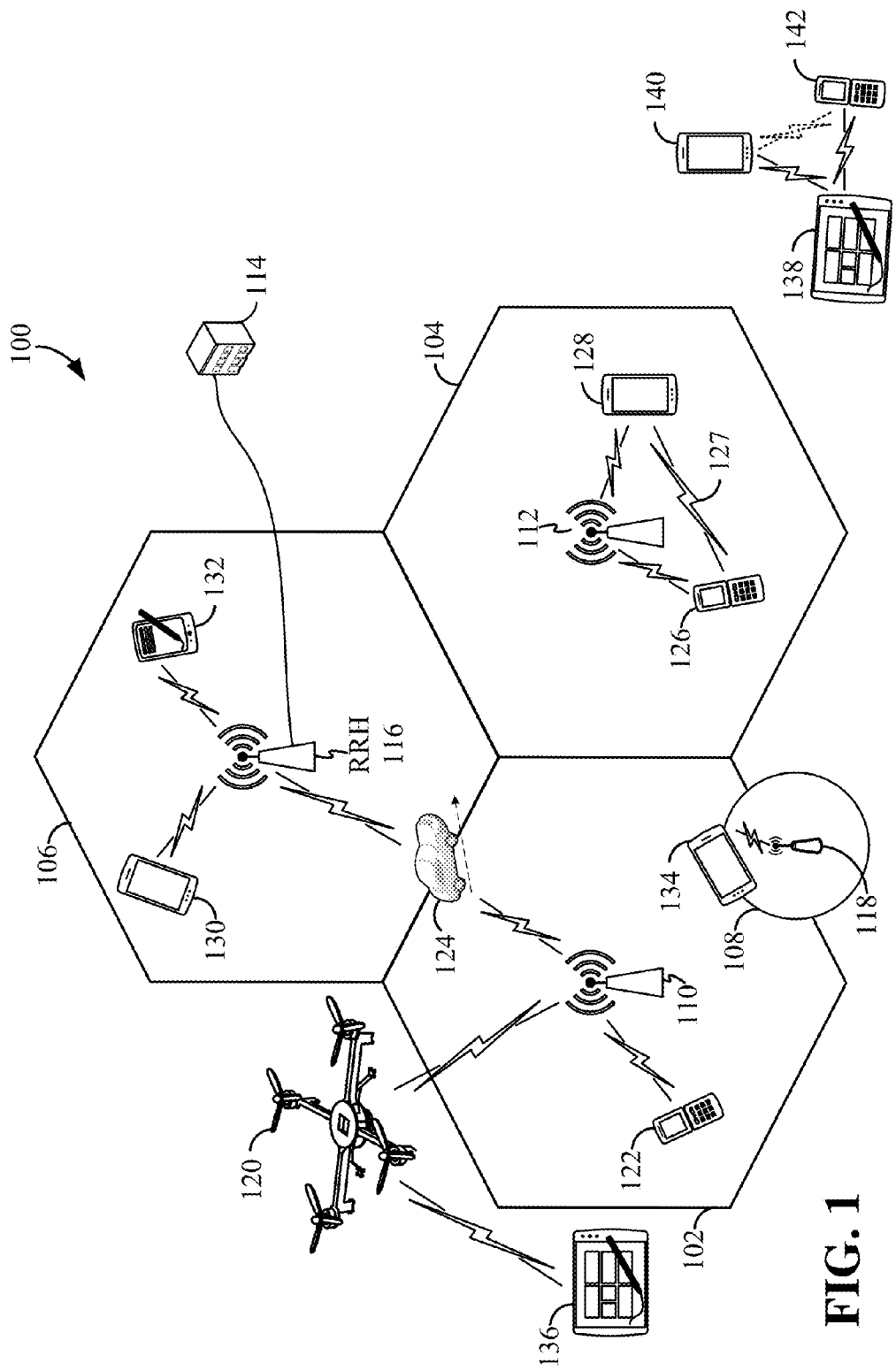
FIG. 1 is a conceptual diagram illustrating an example of an access network according to some embodiments.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at the scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Communication Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
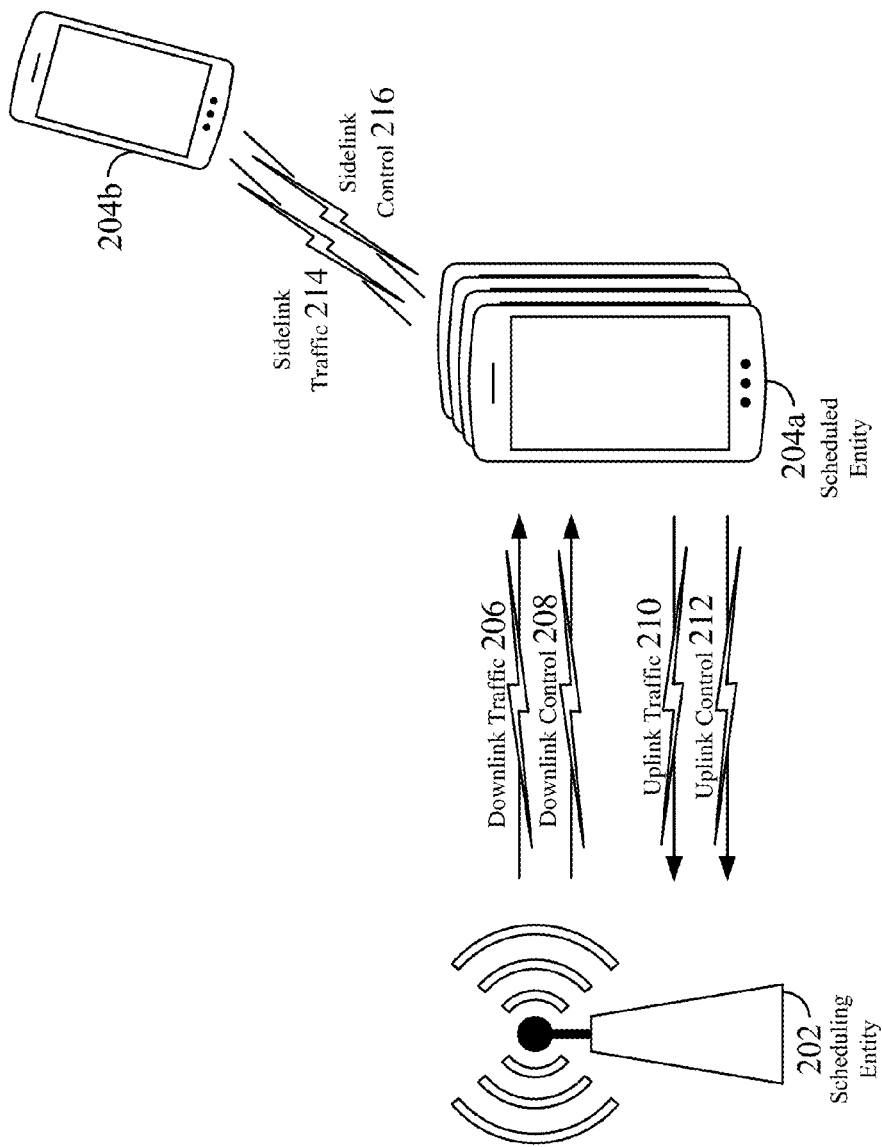
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

Duplexing

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times, the channel is dedicated for transmissions in one direction, while at other times the channel is dedicated for transmissions in the other direction, where the direction may change very rapidly, e.g., several times per slot.

Mimo/Beamforming

Figure 3:
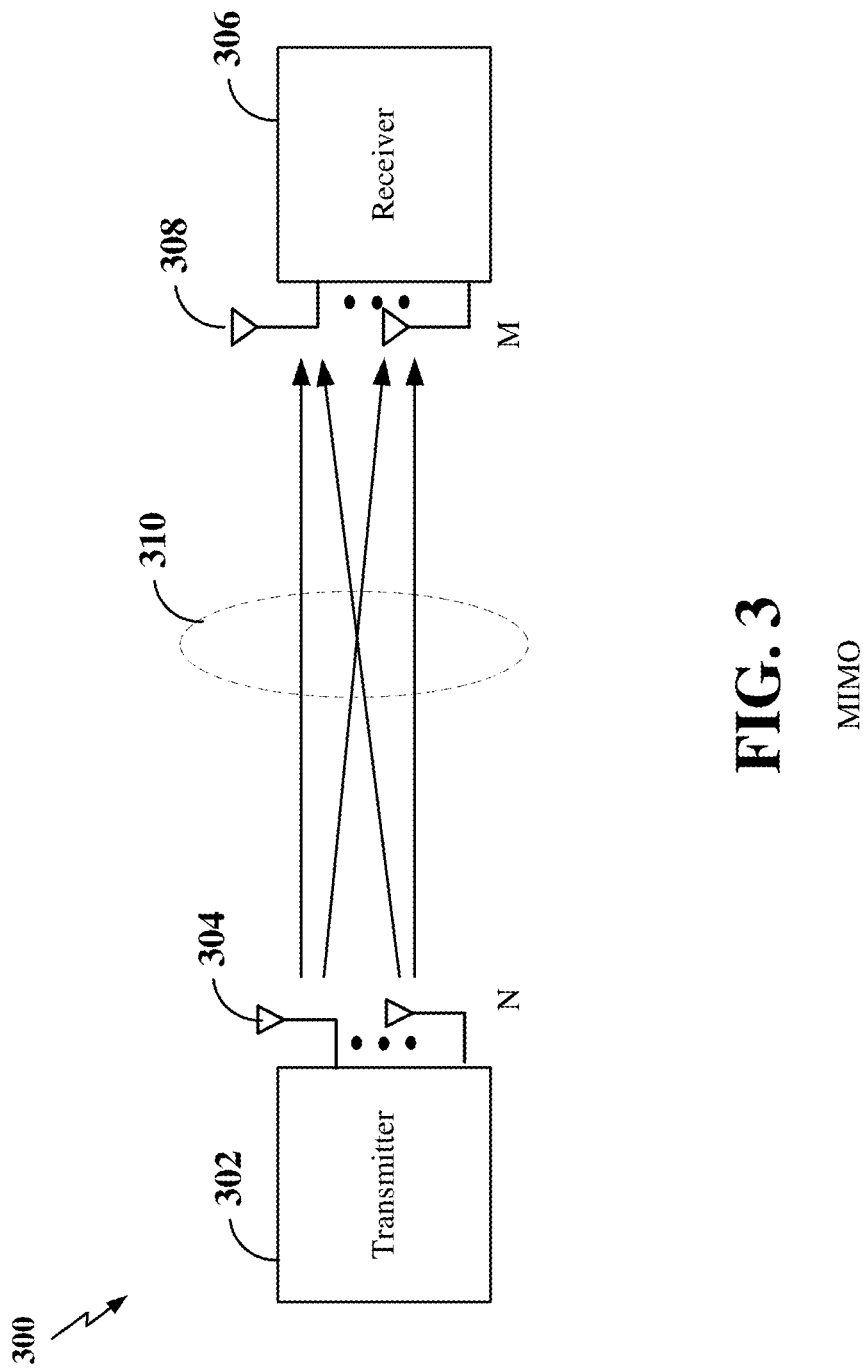
FIG. 3 is a block diagram illustrating a transmitter and receiver communicating utilizing multi-input multi-output (MIMO) according to some embodiments.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 202, a scheduled entity 204, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, over different ports, simultaneously on the same time-frequency resource. The data streams may be transmitted over these different ports to a single UE to increase the data rate; or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams, layers, or ports corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator transmitted from the UE to the base station. The rank indicator may be determined based on the antenna configuration (e.g., the number of transmit and receive antennas) and a measured signal-to-interference-and-noise ratio (SINR) on each of the receive antennas. The rank indicator may indicate, for example, the number of layers that may be supported under the current channel conditions. The base station may use the rank indicator, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CRS with separate CRS sequences for each layer, to provide for multi-layer channel estimation. From the CRS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Multiplexing/Multiple Access

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

OFDM

Figure 4:
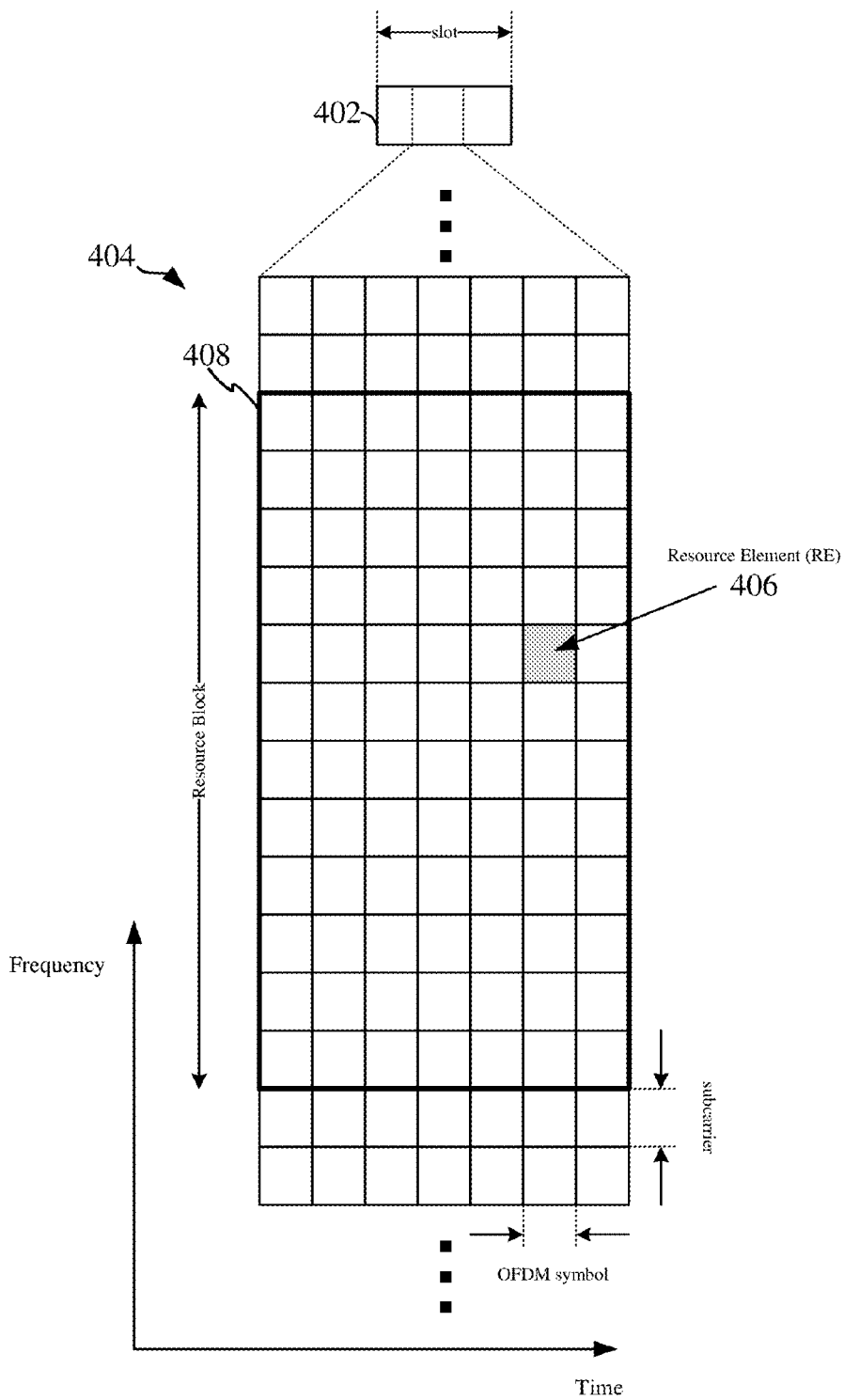
FIG. 4 is a schematic diagram illustrating a resource block (RB) in an orthogonal frequency division multiplex (OFDM) waveform according to some embodiments.

Various aspects of the present disclosure will be described with reference to an OFDM waveform, as illustrated in FIG. 4. That is, in a 5G NR radio access network, it is anticipated that OFDM may be utilized for DL transmissions, UL transmissions (OFDMA), and/or sidelink transmissions. Accordingly, it should be understood that various aspects of the present disclosure may be applied to any of these links when utilizing OFDM. Furthermore, in a 5G NR radio access network, a waveform other than OFDM may be utilized for UL and/or sidelink transmissions, such as SC-FDMA. It should be further understood that various aspects of the present disclosure may be applied to an SC-FDMA waveform in substantially the same way as described herein below. That is, while some examples of the present disclosure may focus on a DL OFDM link for clarity, it should be understood that the same principles may be applied to DL, UL, and sidelink, utilizing OFDM as well as SC-FDMA waveforms.

Referring now to FIG. 4, an exemplary DL slot 402 in an OFDM air interface is illustrated. However, as those skilled in the art will readily appreciate, the slot structure for any particular application may vary from the example described here, depending on any number of factors. In this example, a portion of a time slot (slot) 402 is expanded to illustrate a resource grid 404, expanded in time and frequency dimensions. Here, time is in the horizontal direction with units of OFDM symbols; and frequency is in the vertical direction with units of subcarriers.

That is, a resource grid 404 may be used to schematically represent time-frequency resources. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain and, in some examples depending on the length of a cyclic prefix (CP) used in each OFDM symbol, any suitable number of consecutive OFDM symbols in the time domain. An RB may be the smallest unit of resources that can be allocated to a UE. Thus, the more RBs scheduled for a UE, and the higher the modulation scheme chosen for the air interface, the higher the data rate for the UE. In this illustration, the RB 408 is shown as occupying less than the entire bandwidth of the slot 402, with some subcarriers illustrated above and below the RB 408. In a given implementation, the slot 402 may have a bandwidth corresponding to any number of one or more RBs 408. Further, in this illustration, the RB 408 is shown as occupying less than the entire duration of the slot 402, although this is merely one possible example.

As described in further detail below (see, e.g., FIG. 6), in a TDD carrier, one slot 402 may include both UL and DL transmission portions. Within the present disclosure, it is assumed that a single RB such as the RB 408 entirely corresponds to a single direction of communication (either transmission or reception for a given device). Thus, any given slot on TDD carrier may include a sequence or set of one or more RBs for one direction of communication (e.g., DL), and a sequence or set of one or more RBs for another direction of communication (e.g., UL). In a further aspect of the disclosure, any given slot on a TDD carrier may include a sequence or set of one or more RBs for one direction of communication (e.g., DL), and a sequence or set of one or more symbols (i.e., a smaller allocation than a complete RB) for another direction of communication (e.g., UL).

Although not illustrated in FIG. 4, the various REs 406 within the RB 408 may be scheduled to carry one or more physical channels, including control channels, shared channels, data channels, etc. Other REs 406 within the RB 408 may also carry pilots or reference signals, including but not limited to a demodulation reference signal (DMRS), a control reference signal (CRS), or a sounding reference signal (SRS). It should be noted that above CRS may be defined differently from the cell-specific reference signal (CRS) in LTE. In this context, CRS simply refers to the reference signal that is used for the demodulation of the control channel; For brevity, when the term DMRS is used without further qualification, it is used to refer to the reference signal used for the demodulation of the data channel. These pilots or reference signals may provide for a receiving device to perform channel estimation of the corresponding channel, which may enable coherent demodulation/detection of the control and/or data channels within the RB 408.

In a DL transmission, the transmitting device 302 (e.g., the scheduling entity 202) may allocate one or more REs 406 within the RB 408 to carry DL control information 208 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, information about a modulation and coding scheme (MCS), scheduling information, a grant, and/or an assignment of REs for DL and UL transmissions. For example, a grant may include information utilized by a UE to identify its resources, where to receive the PDSCH in that slot, and how to decode it. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. Note that the DCI carried on the PDCCH may further include a retransmission indicator (RI) indicating whether the current transmission is a HARQ retransmission.

In some aspects of the present disclosure, certain control information such as some of that carried within the DCI in a legacy 4G LTE network may be pulled into a secondary physical control channel. As one nonlimiting example, this secondary physical channel may be referred to as a physical downlink retransmission indicator channel (PDRICH); however, any suitable nomenclature may be used. As described further below, such a secondary physical control channel (referred to below as S-PCCH) may include a subset of the DCI described above, including but not limited to a retransmission indicator (RI); and in various examples, may be carried in a control subband or control region of a slot, or in a data region of a slot.

In an UL transmission, the transmitting device 302 (e.g., the scheduled entity 204) may utilize one or more REs 406 within the RB 408 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, the RB 408 may include one or more REs 406 allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within a data region may be configured to carry system information blocks (SIBs), carrying information that may enable access to a given cell.

The channels or carriers described above are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Scalable Numerology

In OFDM, to maintain orthogonality of the subcarriers or tones, the subcarrier spacing may be equal to the inverse of the symbol duration. A scalable numerology refers to the capability of the network to select different subcarrier spacings, and accordingly, with each spacing, to select the corresponding symbol duration, including the cyclic prefix length. The symbol duration should be short enough that the channel does not significantly vary over each symbol, in order to preserve orthogonality and limit inter-subcarrier interference.

Figure 5:
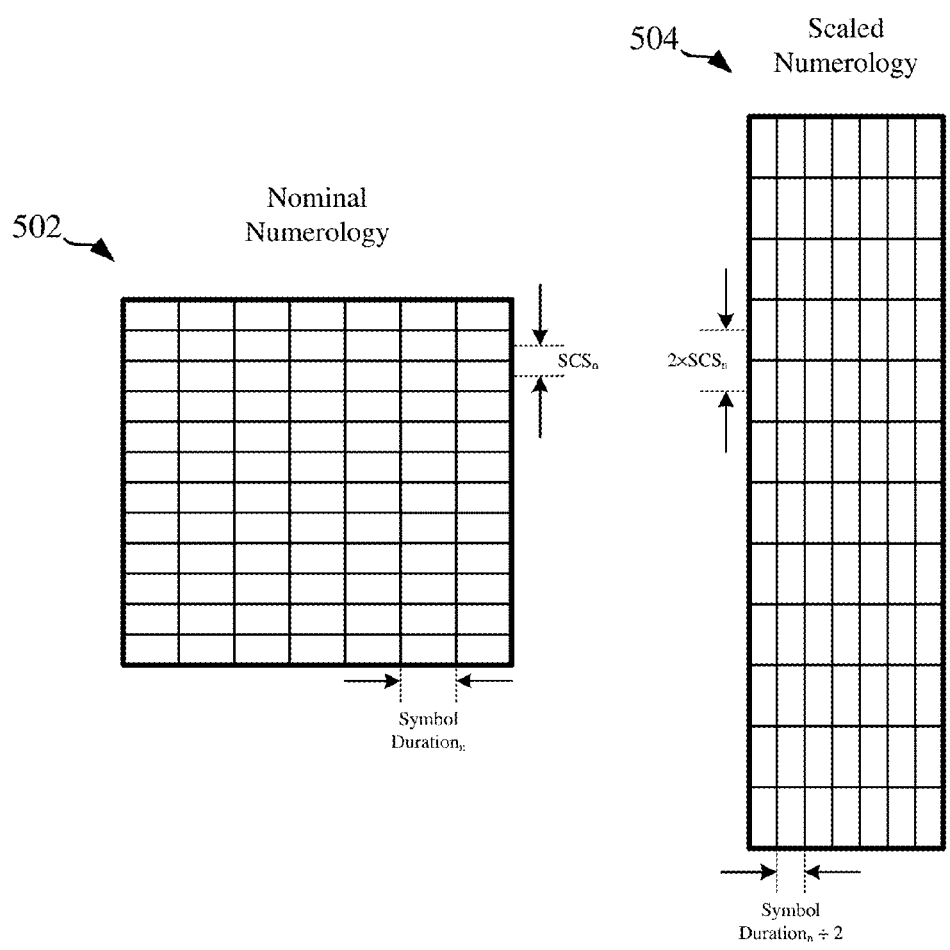
FIG. 5 is a schematic diagram illustrating a scalable numerology for OFDM RBs according to some embodiments.

To illustrate this concept of a scalable numerology, FIG. 5 shows a first RB 502 having a nominal numerology, and a second RB 504 having a scaled numerology. As one example, the first RB 502 may have a 'nominal' subcarrier spacing ($SCS_n$) of 30 kHz, and a 'nominal' symbol duration$_n$ of 33.3 μs (e.g., the inverse of the subcarrier spacing). Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol duration$_n$)÷2=16.7 μs.

Of course, a scaled numerology need not reflect such a two-to-one relationship in a given implementation. That is, any suitable scaling of a nominal numerology may be utilized within the scope of the present disclosure. Further, in this example, for ease of illustration the use of a CP has not been discussed.

Self-Contained Slot

Figure 6:
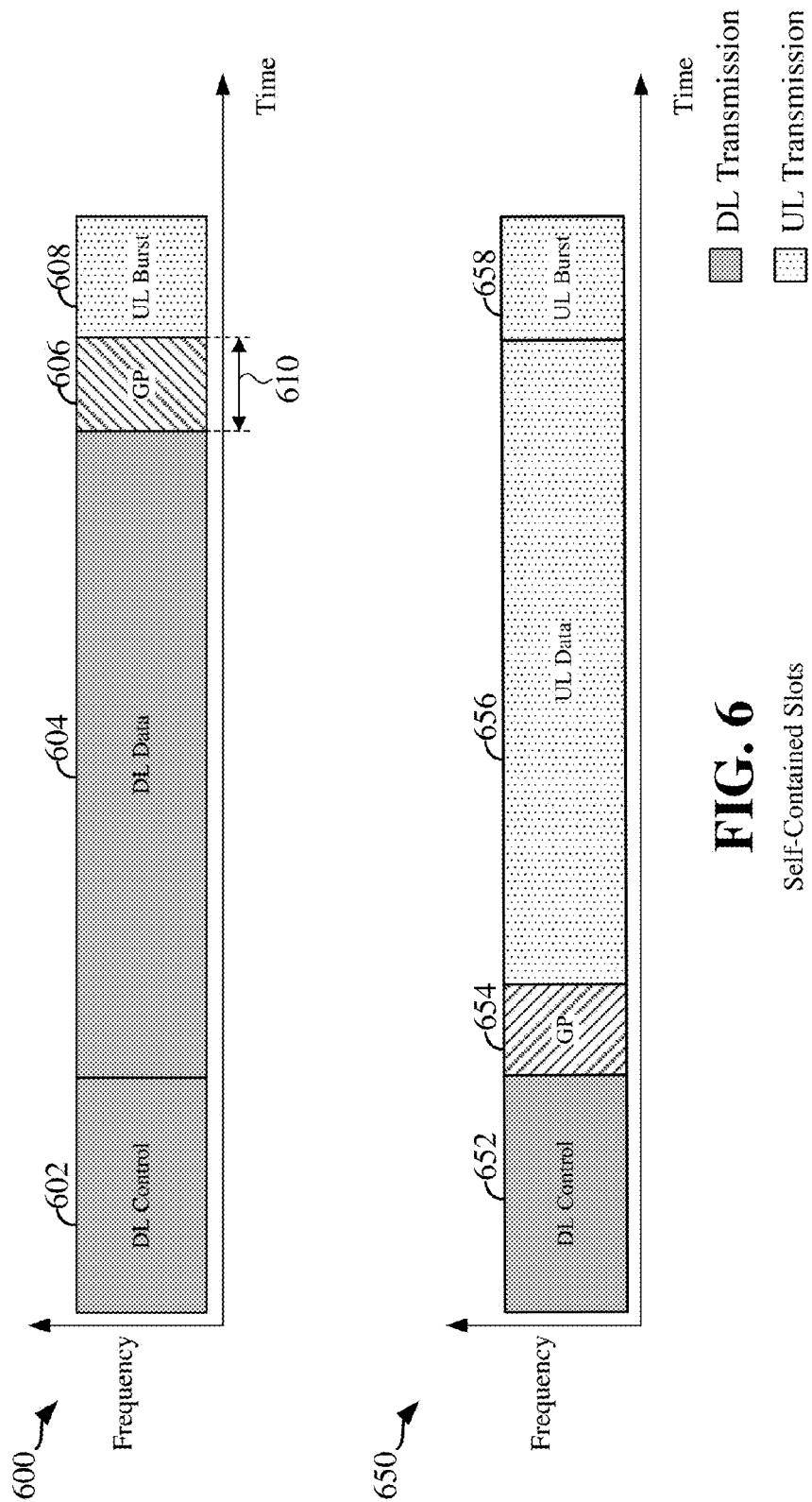
FIG. 6 is a schematic diagram illustrating self-contained downlink (DL)-centric and uplink (UL)-centric slots according to some embodiments.

As discussed above, wireless communications in the radio access network 100 may be organized in terms of slots. According to an aspect of the disclosure, one or more of these slots may be self-contained slots. For example, FIG. 6 illustrates two example structures of self-contained slots 600 and 650 for transmission on a TDD carrier. Here, the slots 600 and 650 may correspond to the slot 402 described above and illustrated in FIG. 4.

In the illustrated example, a DL-centric slot 600 may be a transmitter-scheduled slot. The nomenclature DL-centric generally refers to a structure wherein more resources are allocated for transmissions in the DL direction (e.g., transmissions from the scheduling entity 202 to the scheduled entity 204). Similarly, an UL-centric slot 650 may be a receiver-scheduled slot, wherein more resources are allocated for transmissions in the UL direction (e.g., transmissions from the scheduled entity 204 to the scheduling entity 202).

Each slot, such as the DL-centric slots 600 and 650, may include transmit (Tx) and receive (Rx) portions. For example, in the DL-centric slot 600, the scheduling entity 202 first has an opportunity to transmit control information, e.g., on a PDCCH, in a DL control region 602, and then an opportunity to transmit DL user data or traffic, e.g., on a PDSCH in a DL data region 604. Following a guard period (GP) region 606 having a suitable duration 610, the scheduling entity 202 has an opportunity to receive UL data and/or UL feedback including any UL scheduling requests, CSF, a HARQ ACK/NACK, etc., in an UL burst 608 from other entities using the carrier. Here, a slot such as the DL-centric slot 600 may be referred to as a self-contained slot when all the data carried in the data region 604 is scheduled in the control region 602 of the same slot; and further, when all the data carried in the data region 604 is acknowledged (or at least has an opportunity to be acknowledged) in the UL burst 608 of the same slot. In this way, each self-contained slot may be considered a self-contained entity, not necessarily requiring any other slot to complete a scheduling-transmission-acknowledgment cycle for any given packet.

The GP region 606 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 202. Accordingly, the GP region 606 may allow an amount of time after the DL data region 604 to prevent interference, where the GP region 606 provides an appropriate amount of time for the scheduling entity 202 to switch its RF antenna direction, an appropriate amount of time for the over-the-air (OTA) transmission, and an appropriate amount of time for ACK processing by the scheduled entity.

Similarly, the UL-centric slot 650 may be configured as a self-contained slot. The UL-centric slot 650 is substantially similar to the DL-centric slot 600, except the data region 656 is in the UL direction.

In the exemplary slots 600 and 650, it is seen that the various control and data regions are schematically illustrated as if they extend across the entire system bandwidth of the carrier. However, this is not necessarily the case. Because the system bandwidth can be large (e.g., >100 MHz), a UE may not be able to, or it may not be energy-efficient to monitor the entire system bandwidth for its control messages. Therefore, the control DCI may be located into one or more control subbands, each taking, for example, 5-20 MHz.

The slot structure illustrated in slots 600 and 650 is merely one example of self-contained slots for use on a TDD carrier. Other examples may include a common DL portion at the beginning of every slot, and a common UL portion at the end of every slot, with various differences in the structure of the slot between these respective portions. Other examples still may be provided within the scope of the present disclosure.

When utilizing such a self-contained slot, depending on the duration of the slot, the processing capabilities of scheduling and scheduled entities may be strained. For example, for the DL-centric slot 600, a receiving UE may be required to decode and process all bits in the control and data regions in time to prepare a HARQ-ACK transmission in the UL burst 608. Further, the receiving UE may be required to calculate one or more channel estimates of the DL carrier based on various pilots or reference signals within the control and/or data regions in time to prepare a channel state feedback (CSF) transmission in the UL control burst 608.

While the specific examples and embodiments described below may generally assume the use of slots such as those illustrated in FIG. 6 on a TDD carrier, those of ordinary skill in the art will recognize that the various concepts described herein may equivalently (or with simple modification) apply to slots on paired FDD carriers. For example, when making reference to DL control region and DL data region, resources on a DL component carrier may be utilized; and when making reference to an UL control region and UL data region, resources on an UL component carrier may be utilized.

Single-Interlace Transmission Mode

Figure 7:
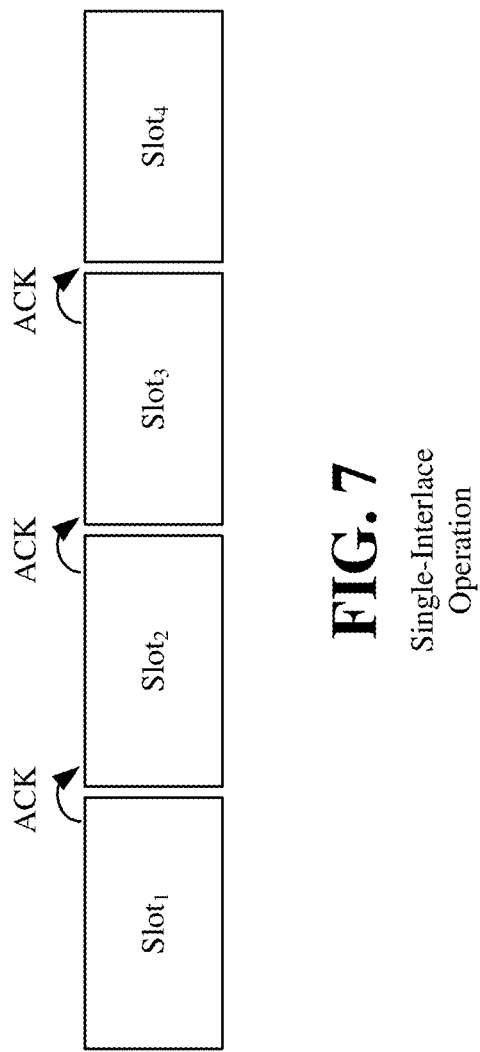
FIG. 7 is a schematic diagram illustrating a single-interlace transmission mode according to some embodiments.

Similar issues with the processing timeline can appear when a system is configured for a single-interlace transmission mode. Here, single-interlace refers to a scheduling mode wherein the content of a given slot, such as whether that slot includes a HARQ retransmission, is scheduled to depend on an ACK transmitted in the previous, adjacent sequential slot. FIG. 7 schematically illustrates one example of this scheme with four sequential DL-centric slots. As represented by the arrows labeled "ACK," the content of $slot_2$ depends on the ACK from $slot_1$; the content of $slot_3$ depends on the ACK from $slot_2$; and the content of $slot_4$ depends on the ACK from $slot_3$. In this case, when the scheduling entity receives the ACK corresponding to $slot_1$, there may be very little time to process the ACK and determine whether to send a retransmission or a new transmission in $slot_2$. That is, because the ACK may carried in the UL burst region 608 at the very end of $slot_1$, then if the control DCI were at the very beginning of $slot_2$, then the scheduling entity would have virtually no time to make this decision (e.g., only an amount of time equal to a fraction of the guard period).

Processing Timeline Optimization

While the self-contained slot and the single-interlace transmission mode may result in a tight processing timeline, these schemes are desirable in a wireless communication network to reduce latency. That is, the time it takes to successfully deliver a packet or message, or to respond to a packet or message. Moreover, when a scaled numerology as illustrated in FIG. 5 is utilized, because the symbol duration is smaller, the processing timeline can be particularly strained.

Accordingly, one or more aspects of the present disclosure provide various slot structures, including channel placement, multiplexing options, etc., to relax the processing timeline for wireless communication devices. Furthermore, beyond the slot structure, further aspects of the disclosure additionally provide for treatment of certain transmissions carried in a slot to further relax the processing timeline. While many of the drawings and description that follow refer specifically to a scaled numerology, with a shortened symbol duration, it is to be understood that these examples may be applied to channels and slots utilizing any suitable numerology or symbol duration. That is, while a scaled numerology such as the RB 504 illustrated in FIG. 5 compounds processing timeline issues, such processing timeline issues may remain even with the use of a nominal numerology. Furthermore, while many of the drawings and description that follow refer specifically to a DL-centric slot in a TDD carrier, it is to be understood that these examples may be applied to channels and slots utilizing any suitable structure. That is, while a self-contained slot and/or single-interlace transmission mode may compound processing timeline issues, such processing timeline issues may remain even with the use of a multi-interlace transmission mode, and/or a non-self-contained slot.

Moreover, various aspects of the disclosure provided below are not limited to TDD slots. For example, in an FDD carrier, a slot structure in both the UL subcarrier and the DL subcarrier is an important consideration in terms of processing timeline management. While many of the examples described below may refer to a TDD carrier and a TDD slot structure, those of ordinary skill in the art will comprehend that the same concepts may easily be adopted within an FDD carrier and FDD slot structure.

Within a DL-centric slot such as the slot 600, the placement of the channels within the slot can substantially affect the processing timeline, which can affect the latency. For example, if information that requires substantial processing time at a receiving UE were placed at the very end of the DL data region 604, the receiving UE may not have sufficient time to complete the processing of that information before its next scheduled transmission. Further, the placement of the channels within the slot also affects the required performance of the modem at the receiving device, which is reflected in its cost and power consumption.

Various aspects of the present disclosure pay particular mind to the placement of certain channels within a slot, such as the DL-centric slot 600. These channels include, but are not limited to, the CRS, PDCCH, S-PCCH, DMRS, and data channel. However, the various concepts and ideas presented in this disclosure are not limited to the placement of these channels, or to the DL-centric TDD slot, but may be applied by those of ordinary skill in the art to any channels in any suitable slot.

Figure 8:
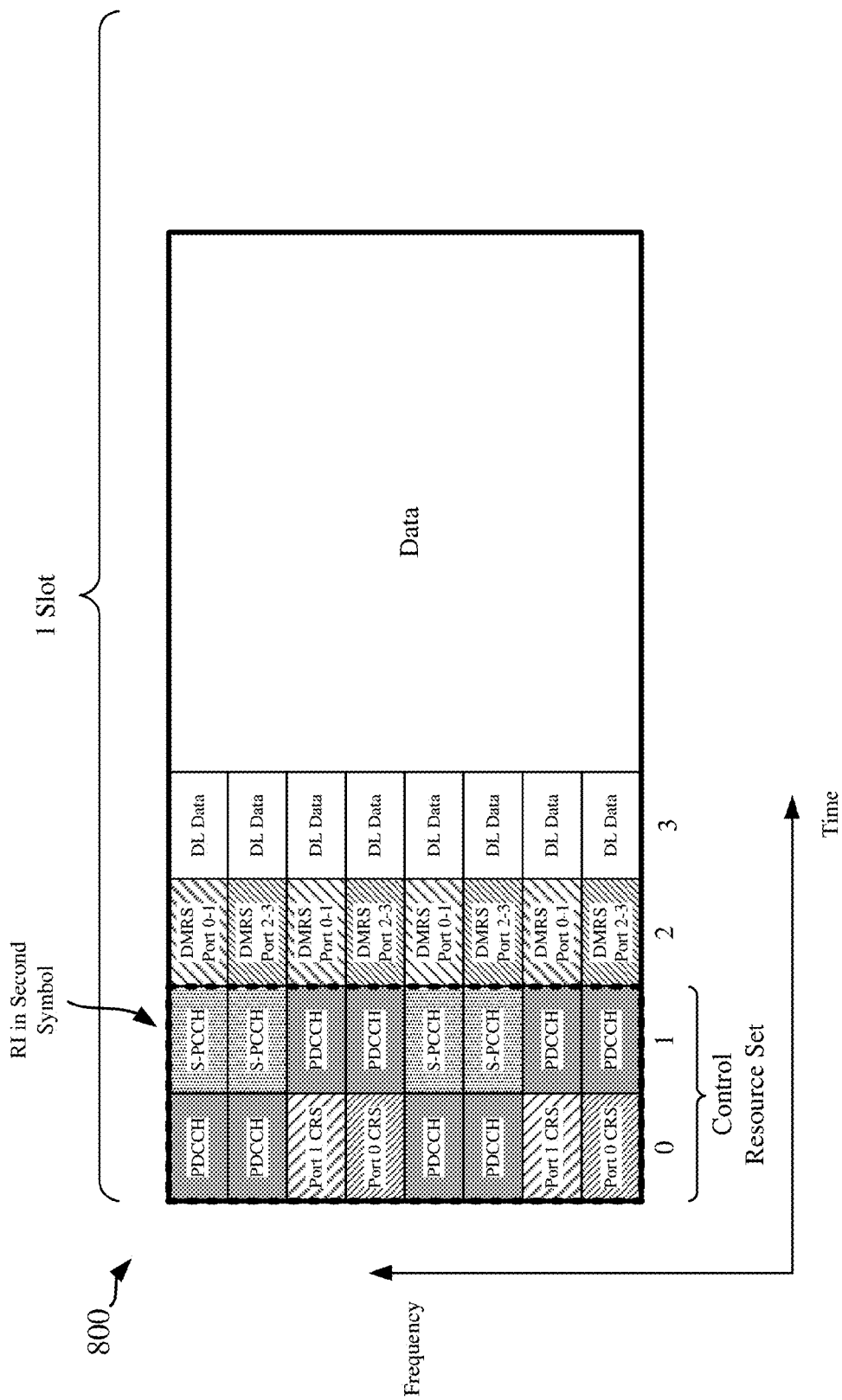
FIG. 8 is a schematic diagram illustrating a slot structure for a DL-centric slot according to one example.

FIG. 8 is a schematic diagram illustrating certain aspects of a baseline DL-centric slot 800 as it may be implemented in some examples according to the present disclosure. In the illustrated slot, a vertical axis represents frequency, where the slot is divided into tones or sub-carriers. Further, a horizontal axis represents time, where the slot is divided into symbols. It is to be understood that the slot structure illustrated in FIG. 8 may correspond to a nominal numerology 502, a scaled numerology 504, or any suitable numerology.

With reference to the exemplary DL-centric TDD slot 600 described above and illustrated in FIG. 6, the slot 800 in FIG. 8 and others described throughout the present disclosure generally correspond to the DL control region 602 and part of the DL data region 604. Furthermore, it is to be understood that the slot structure of FIG. 8 and the later slots disclosed herein may be the same as, or similar to corresponding portions of a DL slot on a DL subcarrier in a FDD carrier. Further, those of ordinary skill in the art will understand that the concepts discussed herein may be applied to an UL-centric slot on a TDD carrier, and/or an UL slot on an UL subcarrier in a FDD carrier.

FIG. 8 as illustrated only shows a portion of slot structure, i.e., details of the first few symbols and a subset of the frequency tones, sufficient to illustrate distinctive features of the slot design. This portion of the slot, as illustrated, only includes downlink channels. It is to be understood that a remaining portion of the slot, a portion of which is illustrated and merely labeled "Data," may include downlink data in the DL-centric slot. In a TDD carrier, the slot may further include a guard period and an UL burst occupying approximately the final two symbols of the slot. Moreover, a slot may include additional subcarriers above and/or below those illustrated. For the purpose of description, it may be assumed that the illustrated slot, or portion of a slot, corresponds to a resource allocation for a particular scheduled entity.

As seen in FIG. 8, a portion of the slot including the first two symbols (symbols 0 and 1) is identified as a control resource set, corresponding to the DL control region. In the illustrated example, the control resource set carries control reference signals (CRS), PDCCH bits, and S-PCCH bits. In this example, the PDCCH is interleaved with the CRS in the first symbol (symbol 0), and the PDCCH is interleaved with the S-PCCH in the second symbol (symbol 1). The CRS is shown including different CRSs corresponding to two ports: port 0 and port 1, utilized for transmit diversity, or space frequency block coding (SFBC). The use of such SFBC within the control resource set is merely one example, and those of ordinary skill in the art will recognize that other transmit diversity schemes may be utilized within the control resource set. As one further nonlimiting example, the control resource set may be configured for single-port transmit diversity, with a corresponding CRS pattern. Demodulation reference signals (DMRS) are then carried on the third symbol (symbol 2).

As described above, the CRS and DMRS are used for channel estimation and coherent demodulation of information-bearing REs. In general, the CRS is utilized by the receiving device for REs included within the control resource set; and the DMRS is utilized by the receiving device for REs included within the data region. In the present document, control or data REs that are demodulated based on the CRS may be referred to as CRS-based; and control or data REs that are demodulated based on the DMRS may be referred to as DMRS-based.

As described above, for a single-interlace transmission mode, just prior to the beginning of the illustrated slot 800, the scheduling entity may receive an ACK/NACK from the UE within the UL burst in the previous slot. To provide for processing time at the scheduling entity, then, the S-PCCH bits may be carried in the second symbol of the slot (symbol 1). That is, according to an aspect of the present disclosure, the PDCCH may carry DCI that is not dependent on the ACK/NACK from the previous slot, and the S-PCCH may carry DCI dependent on the ACK/NACK from the previous slot, including but not limited to the retransmission indicator (RI). With this structure for the control resource set, the scheduling entity has about one symbol time to make the decision, in accordance with the received ACK/NACK, whether to signal within the S-PCCH that the data information carried on this slot will be a new transmission or a retransmission by utilizing the RI. Furthermore, by breaking up the DCI such that the resource allocation is provided first, and later in the slot, RIs may be provided in the S-PCCH, then the scheduling entity has additional time to determine whether to perform a retransmission.

Of course, placement of the RI later in the slot may not be necessary, depending on the processing capabilities of the scheduling entity, and the symbol duration being used. In particular, the scheduling entity may exhibit a minimum ACK-to-RI turnaround time corresponding to its peak performance capability. Thus, the configuration of a slot, and the placement of channels such as the S-PCCH that includes the RI, should be carefully considered, especially in the case where a scaled numerology is used, resulting in a shortened symbol duration.

As seen in FIG. 8, due to the control symbols (e.g., the control resource set) occupying the first symbols within the slot, DMRS/data symbols are pushed further into the slot (i.e., later in time), although they are located as early as they could be outside of the control resource set. That is, because the DMRS symbols do not depend on whether the data is a new transmission or a retransmission, the DMRS symbols may be transmitted in the first symbols outside of the control resource set. This transmission of the DMRS in the first symbols, outside the control resource set, can provide for a processing timeline advantage.

According to a further aspect of the disclosure, a slot may include two or more portions, with each portion of the slot adopting a different SCS. For example, referring to the DL-centric slot 600 in FIG. 6, the UL burst region 608 may adopt a SCS that is double that of the DL data region 604. In another example, the DL control region 602 may adopt a SCS that is double that of the data region 604.

Figure 9:
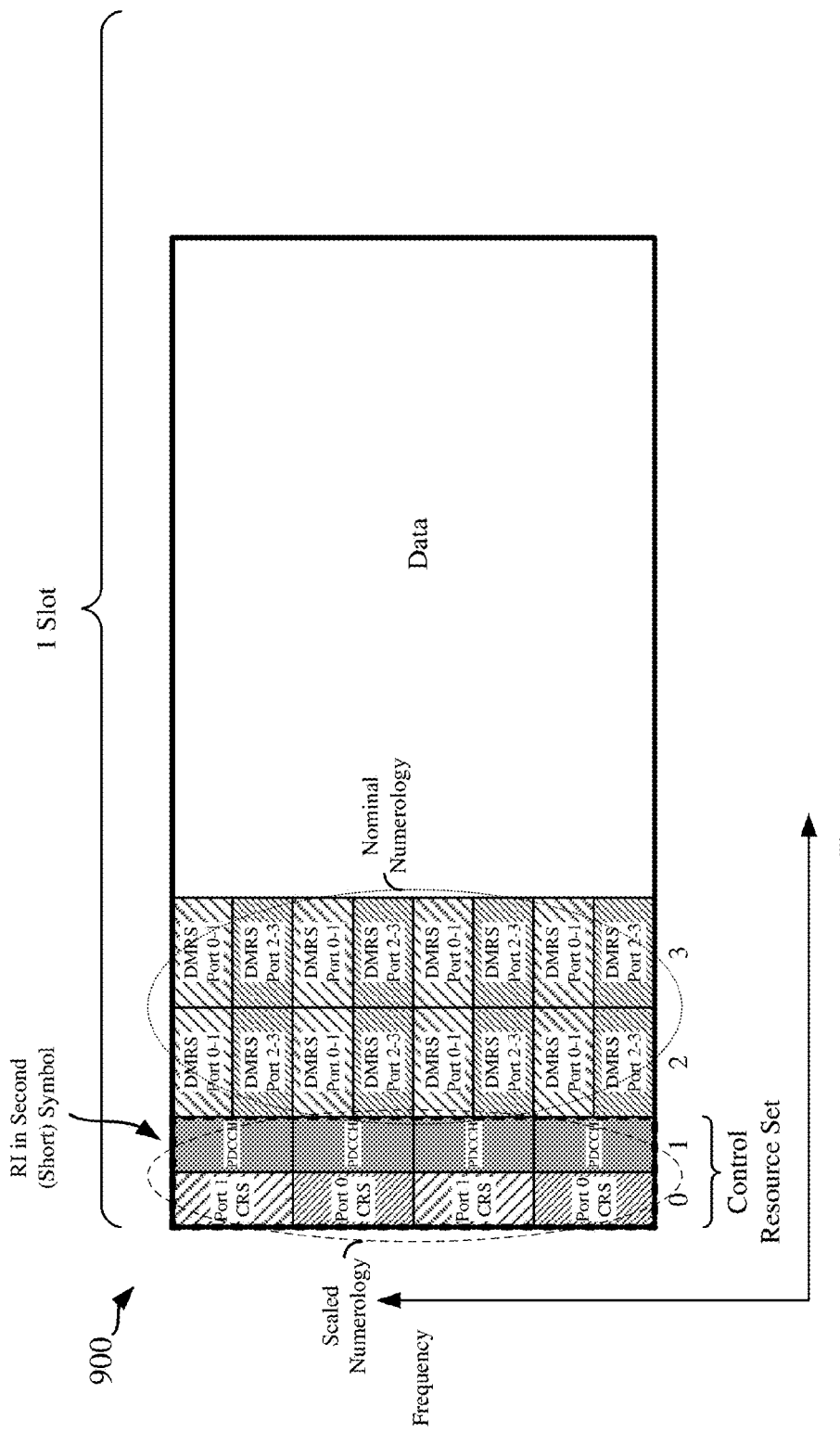
FIG. 9 is a schematic diagram illustrating a slot structure for a DL-centric slot according to another example.

FIG. 9 is a schematic diagram that illustrates such an example with different portions of a slot adopting a different SCS from one another. In this example, a DL control region, carrying a control resource set, may scale differently than a DL data region. For example, the DL control region may scale to a 60 kHz SCS, resulting in two short symbols (symbols 0 and 1) within the duration of a single symbol in a nominal SCS (e.g., 30 kHz). In the illustrated example, a PDCCH may be transmitted during the second short symbol (symbol 1). In this way, for an example using a single-interlace transmission mode, the scheduling entity may be provided with approximately one short symbol time (symbol 0) to process an UL ACK/NACK received at the end of the prior slot. In this time, the scheduling entity may determine whether to send a retransmission, and may accordingly signal the appropriate RI along with the DCI via the PDCCH in the second symbol (symbol 1).

Another feature of the example of FIG. 9 is that it may provide improved pipelining of the CRS and PDCCH processing, utilizing a smaller FFT at twice the rate for the control symbols. That is, by virtue of the smaller FFT, decoding and processing the control symbols may be eased at the receiving UE.

In an example utilizing the slot structure of FIG. 8 with a scaled numerology, and an example utilizing the slot structure of FIG. 9, only one short symbol duration exists from the start of the slot to when the RI (retransmission indicator) becomes available (within the S-PCCH in the example of FIG. 8, and within the PDCCH in the example of FIG. 9). That is, because the symbol duration is reduced with the scaled numerology, these examples may not provide sufficient time for the scheduling entity to decode the ACK/NACK from the previous slot and turnaround the RI transmission.

Figure 10:
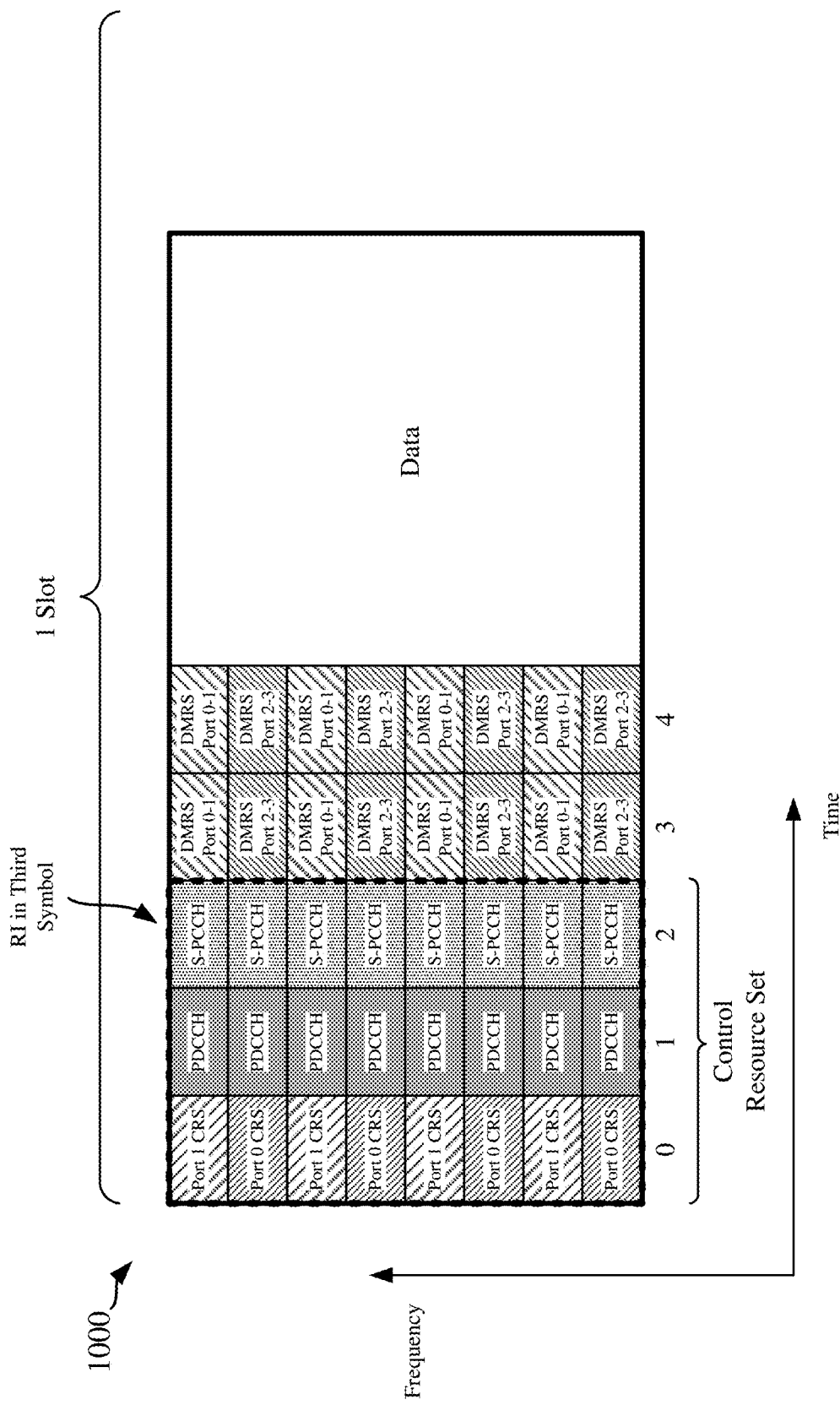
FIG. 10 is a schematic diagram illustrating a slot structure for a DL-centric slot according to another example.

Therefore, one or more aspects of the disclosure may provide for a slot that utilizes a scaled numerology to locate the RI later in the slot, easing the processing timeline for a base station or scheduling entity. For example, FIG. 10 is an illustration of a slot structure utilizing the scaled numerology 504 (e.g., as illustrated in FIG. 5). Here, unlike the examples described above in relation to FIGS. 8 and 9, the RI bits are located in the third symbol (symbol 2) rather than the second symbol (symbol 1).

That is, the RI may be carried on an S-PCCH, and here, the S-PCCH may be pushed later into the slot to give a two-short-symbol time budget for the scheduling entity to process the ACK/NACK from the previous slot, and turnaround the RI. Here, even when utilizing the scaled numerology, this example provides for the same time duration compared to the 1-symbol time duration for an example utilizing a nominal numerology and having the slot structure illustrated in FIG. 8.

In a further aspect of the disclosure, the slot structure illustrated in FIG. 10 provides for a full pilot density for the CRS (in symbol 0) and the DMRS (in symbols 3-4). That is, even though the slot illustrated in FIG. 10 may utilize a scaled numerology with short-duration symbols, because the pilots occupy the full symbols, the same pilot density may appear as the pilot density utilizing a nominal numerology. That is, a pure, straight scaling by two relative to the nominal numerology results in the pilot density being reduced by half. To retain the pilot density, the pilots may be doubled. In this illustration in FIG. 10, all the DMRS pilots are doubled relative to the example described above and illustrated in FIG. 8.

According to a further aspect of the disclosure, the scaled numerology may be utilized when a UE is within an indoor channel. In such an indoor channel, it may be the case that a half-density pilot may suffice. Accordingly, a slot structure with a scaled numerology, utilizing a half-density pilot, may be utilized in some aspects of the disclosure.

Figure 11:
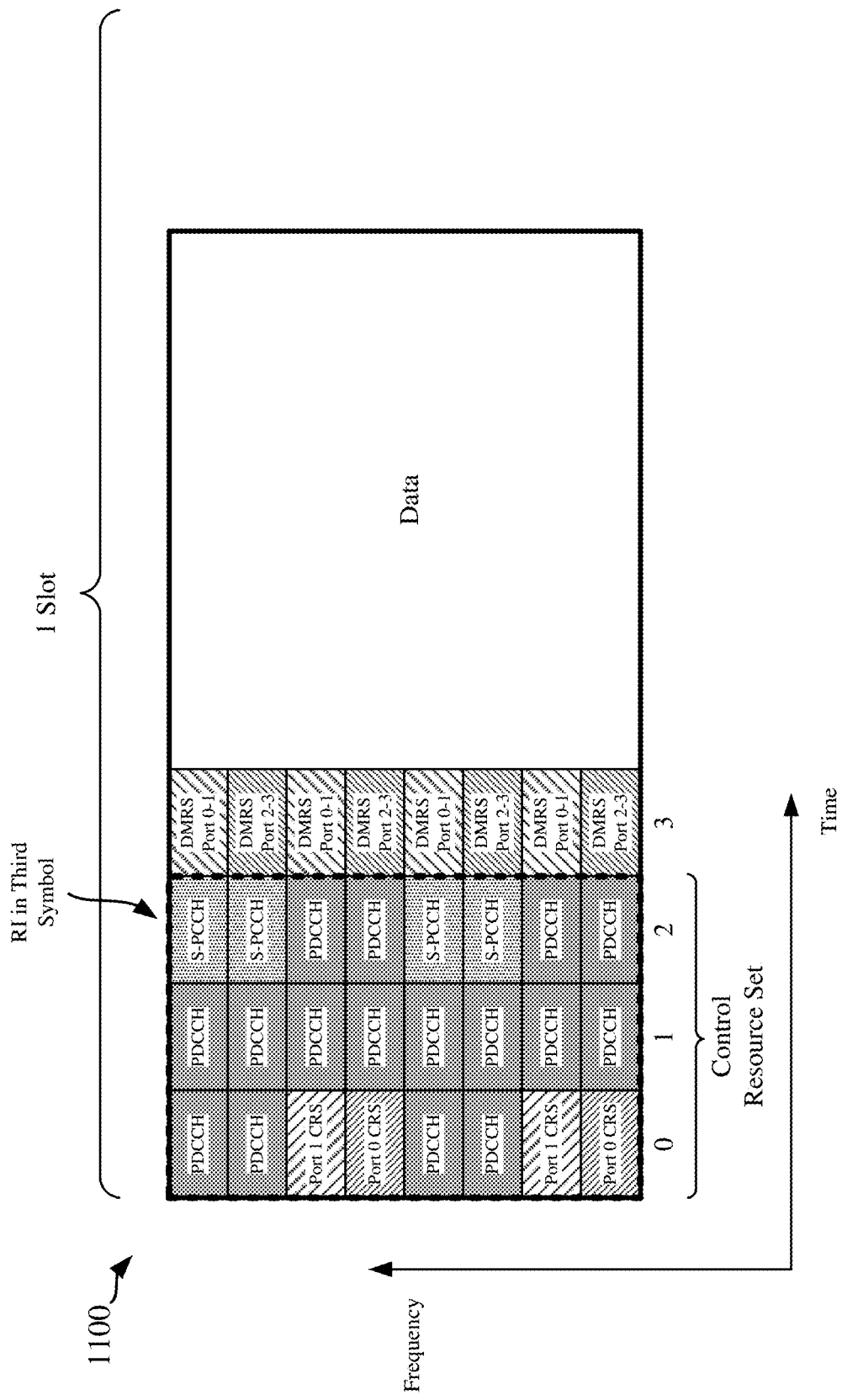
FIG. 11 is a schematic diagram illustrating a slot structure for a DL-centric slot according to another example.

FIG. 11 is a schematic diagram illustrating a slot structure utilizing a scaled numerology, with a half-density pilot structure, according to an aspect of the present disclosure. In the illustrated example, the RI may be located in the third symbol (symbol 2) of the slot, i.e., within the S-PCCH. Further, the pilot density may be reduced by half relative to the pilot density of FIG. 10, as described above.

In the illustrated example of FIG. 11 (and also the above-illustrated examples in FIGS. 8 and 10), the S-PCCH is CRS-based. That is, demodulation of the S-PCCH depends on the CRS, rather than the DMRS. Accordingly, the RI and/or other information included within the S-PCCH may be obtained at the scheduled entity prior to the transmission of the DMRS. Further, the S-PCCH may be configured with the same PHY channel design as that of the PDCCH, and accordingly, the same performance. This configuration can result in some design and implementation effort savings.

In the examples described above and illustrated in FIGS. 10 and 11, the control resource set occupies three full-bandwidth symbols. According to a further aspect of the disclosure, in some scenarios, fewer than three symbols may be sufficient for the control resource set.

Figure 12:
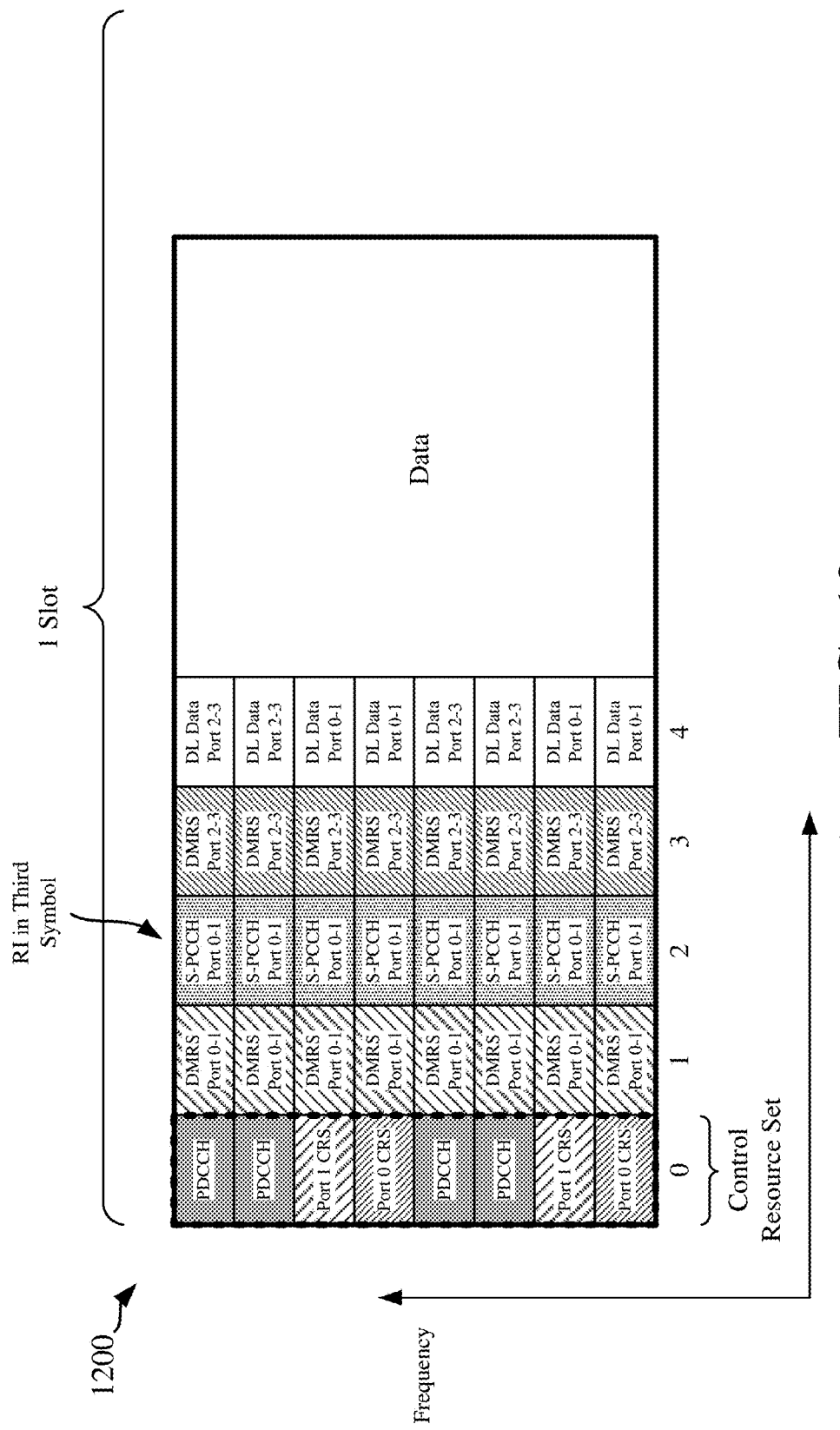
FIG. 12 is a schematic diagram illustrating a slot structure for a DL-centric slot according to another example.
Figure 13:
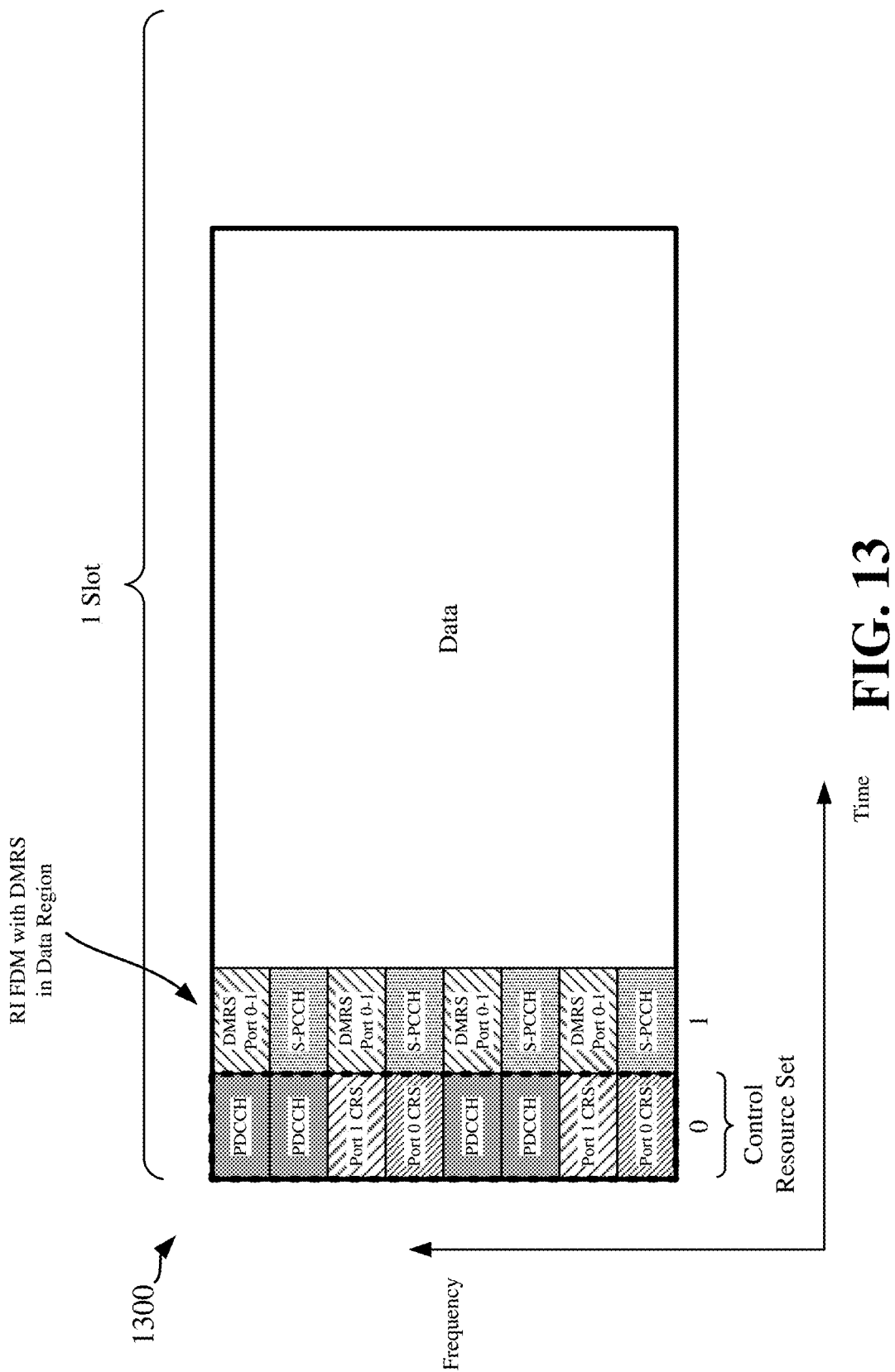
FIG. 13 is a schematic diagram illustrating a slot structure for a DL-centric slot according to another example.

For example, FIGS. 12 and 13 illustrate exemplary slot structures with control and DMRS symbols multiplexed utilizing interleaving.

In the example illustrated in FIG. 12, the slot begins with one control symbol (carrying the PDCCH and CRS), followed by one DMRS symbol (for port 0 and 1), followed by a symbol containing S-PCCH and potentially other control or data. For example, the control resource set carried in the first symbol (symbol 0) may include downlink control information (e.g., a PDCCH), which may accommodate a single interlace transmission mode; and CRS for ports 0 and 1. The second symbol (symbol 1) may include the DMRS for ports 0 and 1, and the third symbol (symbol 2) may include an S-PCCH that carries the retransmission indicator (RI), among other things.

In this example, the S-PCCH for ports 0 and 1 may be DMRS-based, rather than CRS-based. That is, when receiving the slot 1200, a UE or scheduled entity may process the DMRS for ports 0-1 within the second symbol (symbol 1) for the purpose of demodulating the control or data channels which are transmitted on those ports. Furthermore, the S-PCCH may be carried on the third symbol (symbol 2). Here, the respective symbol(s) for ports 0 and 1 may be processed first. In this manner, the processing timeline for the base station or scheduling entity may be relaxed, as described above, by providing time (e.g., about two short symbol lengths in a scaled numerology) for processing an ACK/NACK within a previous slot. Further, in addition to the S-PCCH carried on the third symbol (symbol 2), this symbol may additionally include other PDCCH symbols.

In a further aspect of the disclosure, the scheduling entity may continue to successively transmit pilot symbols over incrementally more ports utilizing an interleaving scheme. For example, if the scheduling entity transmits port 0 and 1 first, as described above, there may be subsequent channels that only use port 0 and 1 (e.g., carried on symbol 2 as described above). Subsequently, the scheduling entity may transmit additional pilots for successive ports, and subsequent data symbols may use those additional ports. This may provide more layers for MIMO. For example, in FIG. 12, symbol 3 includes DMRS for ports 2 and 3, such that data information for these ports may follow in subsequent symbols (e.g., illustrated in symbol 4). In the illustrated example, the fifth symbol (symbol 4) includes DL data using ports 2-3 as well as DL data using ports 0-1. This interleaving scheme may carry on any suitable number of times, interleaving pilots for any number of ports with control and/or traffic bits for the corresponding ports.

In a still further aspect of the disclosure, interleaving DMRS and S-PCCH transmissions may be performed in the frequency domain, in addition to or in the alternative to interleaving in the time domain. For example, FIG. 13 illustrates a slot 1300 having a first symbol (symbol 0) including a control resource set and a second symbol (symbol 1) including a DMRS that is frequency-division multiplexed (FDM) with S-PCCH bits. Such tone multiplexing may be utilized in examples where a DMRS may be located in every second tone, with information such as an S-PCCH multiplexed into the same symbol, in the REs between those carrying the DMRS. When implementing such FDM or tone-multiplexing within the data region of a slot, the information such as the S-PCCH may be demodulated based on the DMRS within the same symbol.

Figure 14:
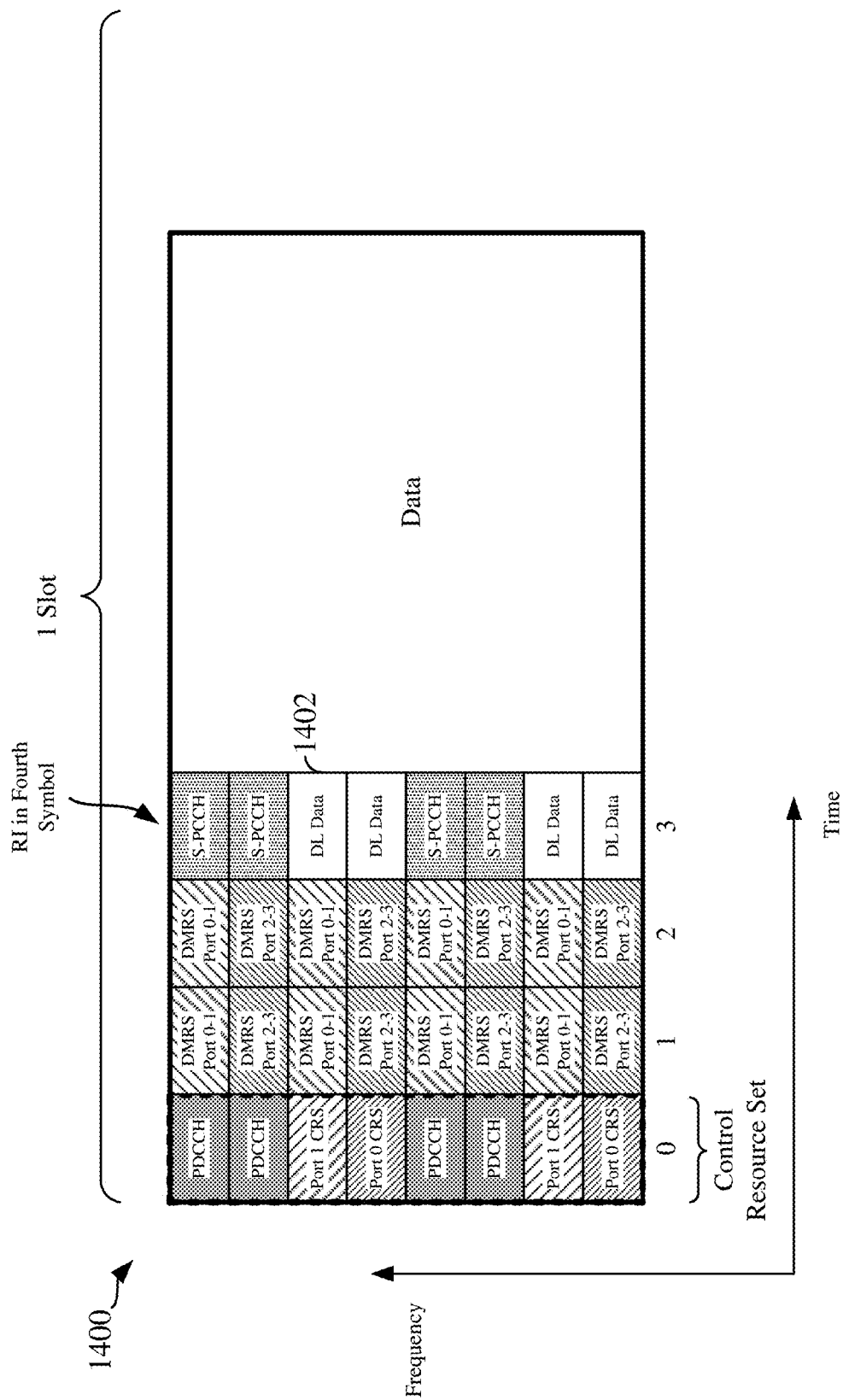
FIG. 14 is a schematic diagram illustrating a slot structure for a DL-centric slot according to another example.

Referring now to FIG. 14, another example of control and DMRS multiplexing is provided according to still further aspects of the present disclosure. This example is similar to the example of FIG. 12, described above, but in FIG. 14, rather than interleaving the control and DMRS symbols in alternate symbols, two DMRS symbols are located in sequence in the second and third symbols (symbols 1 and 2). Further, in this example, a DMRS for ports 0-1 is FDM with a DMRS for ports 2-3 in each of the respective symbols. In an aspect of the disclosure, these DMRS transmissions may be utilized for demodulating DL control and/or data bits corresponding to any of ports 0-3 for the remainder of the slot. Of course, in some examples, the time-interleaving with additional DMRS transmissions for additional ports may be utilized later in the slot, as described above and illustrated in FIG. 12.

When receiving the slot 1400, a UE or scheduled entity may begin processing the DMRS included in the first two symbols following the control region (symbols 0 and 1) as they are received. This UE or scheduled entity may further be capable of starting its processing of the respective DMRS by the end of the second symbol (symbol 1) and third symbol (symbol 2) respectively. Accordingly, after DMRS processing is completed (presumably before the end of symbol 3), the RI included in the fourth symbol (symbol 3) may be demodulated based on the DMRS. Subsequently, demodulation and data processing may begin.

In the example in FIG. 14, the fourth symbol (symbol 3) includes data information 1402 frequency division multiplexed (FDM) with control information (e.g., the S-PCCH bits). According to an aspect of the disclosure, processing this data may be contingent upon completion of processing of the FDM control information. For example (as discussed further below), samples of the DL data 1402 may be buffered or stored in memory for later processing after the RI and/or other control information in the S-PCCH has been processed.

According to a further aspect of the present disclosure, as illustrated in FIG. 14 (and similar to features described above in relation to FIGS. 12 and 13), a slot structure may be configured such that the RI (e.g., carried in the S-PCCH control information) may be included within the data region (i.e., outside the control region). For example, FIG. 14 illustrates the S-PCCH (including the RI) included in the fourth symbol (symbol 3), outside the control region and instead, located within the data region. Here, by being located in the data region and following the DMRS, the S-PCCH may be DMRS-based. That is, rather than utilizing the CRS, the S-PCCH may be demodulated based on the DMRS.

In this way, by placing the RI in an allocated or scheduled resource within the data region rather than the control region, the RI may be located in resources that are allocated to user(s) that are configured for a single-interlace transmission mode only. This differs from other examples described herein where the RI is located within the control resource set, which includes resources that are shared by all users. Furthermore, re-use of the DMRS for demodulating the S-PCCH (in addition to the use of the DMRS for demodulating the user data) may be more efficient, since the DMRS is already provided anyway for user data information for all users.

In some of the examples described above (e.g., the illustrations of FIGS. 8-14), the control resource set has been described and illustrated as occupying an entire bandwidth of a slot, or in other examples, an entire bandwidth of a portion of a slot allocated for a given receiving UE or scheduled entity. However, in another aspect of the disclosure, the control resource set, or control region, of a slot may be limited to a subband within the slot. For example, referring to FIG. 15, a subband (i.e., a set of subcarriers including a portion of the full system bandwidth of the carrier, which may be less than the full bandwidth allocation for a given UE or scheduled entity) within the slot may be a control subband, corresponding to the DL control region. That is, the control resource set, or control region, may be contained within a subband called a control subband.

In any given example, a control subband may extend for any suitable number of symbols. In the example illustrated in FIG. 15, the control resource set, within the control subband, occupies only the first symbol (symbol 0). In this example, the control resource set includes PDCCH bits, a CRS for port 1, and a CRS for port 0. The first symbol (symbol 0) may further include DL data information 1402 multiplexed with the control subband.

This example includes DMRS in the second and third symbols (symbols 1 and 2), and interleaved DL data and S-PCCH bits in the fourth symbol (symbol 3), similar to the example described above and illustrated in FIG. 14. However, the configuration of these symbols is merely illustrative in nature, for the purpose of describing the multiplexing of DL data and the control subband within the first symbol.

As discussed above, in some examples, the S-PCCH may carry a retransmission indicator (RI). The scheduling entity may configure the RI to inform the receiving UE or scheduled entity whether the DL data is a retransmission, or a new transmission. In the example illustrated in FIG. 15, however, the S-PCCH is carried in the fourth symbol (symbol 3), and thus, the DL data 1502 within this the first symbol (symbol 0) is too early to take the RI into account. That is, when the base station or scheduling entity prepares the information corresponding to the DL data 1502 for transmission within the first symbol (or any symbol prior to the RI), then the scheduling entity may not yet have determined whether those data bits 1502 should be a retransmission, or a new transmission. Furthermore, at the receiving UE or scheduled entity, these data bits 1502 may create a processing bottleneck, since decoding and processing the DL data may rely upon information from within the control subband, carried within the same symbol (symbol 0), and/or a channel estimate based on the DMRS carried in later symbols (symbols 1 and 2).

In an aspect of the present disclosure, the data bits 1502 that are FDM with the control subband may be delayed-processing data bits. That is, UE or scheduled entity may buffer or store in memory samples of the data 1502 that are FDM with the control subband, until the RI is received and decoded. After the RI is received and decoded, the UE or scheduled entity may then process the samples of the delayed-processing data 1502. In this example, where the RI is carried in the S-PCCH in the fourth symbol (symbol 3), the delayed-processing data 1502 may be processed after the UE or scheduled entity processes the information in the fourth symbol.

By deferring the processing of the data bits 1502 until after the RI is decoded, the receiving UE or scheduled entity may be provided with time for some catching-up with respect to the processing of the information in the control subband and the DMRS. Furthermore, processing of the data bits 1502 may take into account the information in the RI, even though the data bits 1502 were received earlier in time than the RI.

In a further aspect of the disclosure, particularly (although not exclusively) applicable to examples that utilize a single-interlace transmission mode, the base station or scheduling entity may determine the information to place in the delayed-processing data 1502 before having time to fully process an ACK/NACK from the same UE or scheduled entity in a prior slot. See, e.g., the discussion above in relation to FIG. 7. In this case, the scheduling entity may lack sufficient information to determine whether the content of the delayed-processing data 1402 should correspond to a new transmission (e.g., if the scheduled entity transmitted an ACK), or to a retransmission (e.g., if the scheduled entity transmitted a NACK or no feedback). Thus, the base station may make a blind decision regarding the content of the delayed-processing data 1502. That is, the scheduling entity may simply make an assumption for populating this symbol before the RI is determined and sent (e.g., in the S-PCCH).

In this situation, the content of the delayed-processing data 1502 may or may not be of any value. For example, if the scheduling entity were to send a retransmission of information from a previous slot in the delayed-processing data 1502, but in fact, the UE had already received and acknowledged this information, then the retransmission is not valuable. Accordingly, in an aspect of the present disclosure, the receiving UE or scheduled entity may determine to discard the delayed-processing data 1502. The determination whether or not to discard the delayed-processing data 1502 may be based on one or more factors, including but not limited to whether the transmission corresponds to a single-interlace transmission mode; channel conditions; or other factors that might inform a decision whether the delayed-processing data includes valuable information. For example, if the transmission is a single-interlace transmission, the UE or scheduled entity may discard the delayed-processing data 1502; and if the transmission is a multiple-interlace transmission, the UE or scheduled entity may buffer, and later process samples of the delayed-processing data 1502. In another example, even in a single-interlace transmission mode, the UE may buffer and later process the samples of the delayed-processing data 1502, and determine whether to discard its contents based on the values or information contained therein.

Figure 15:
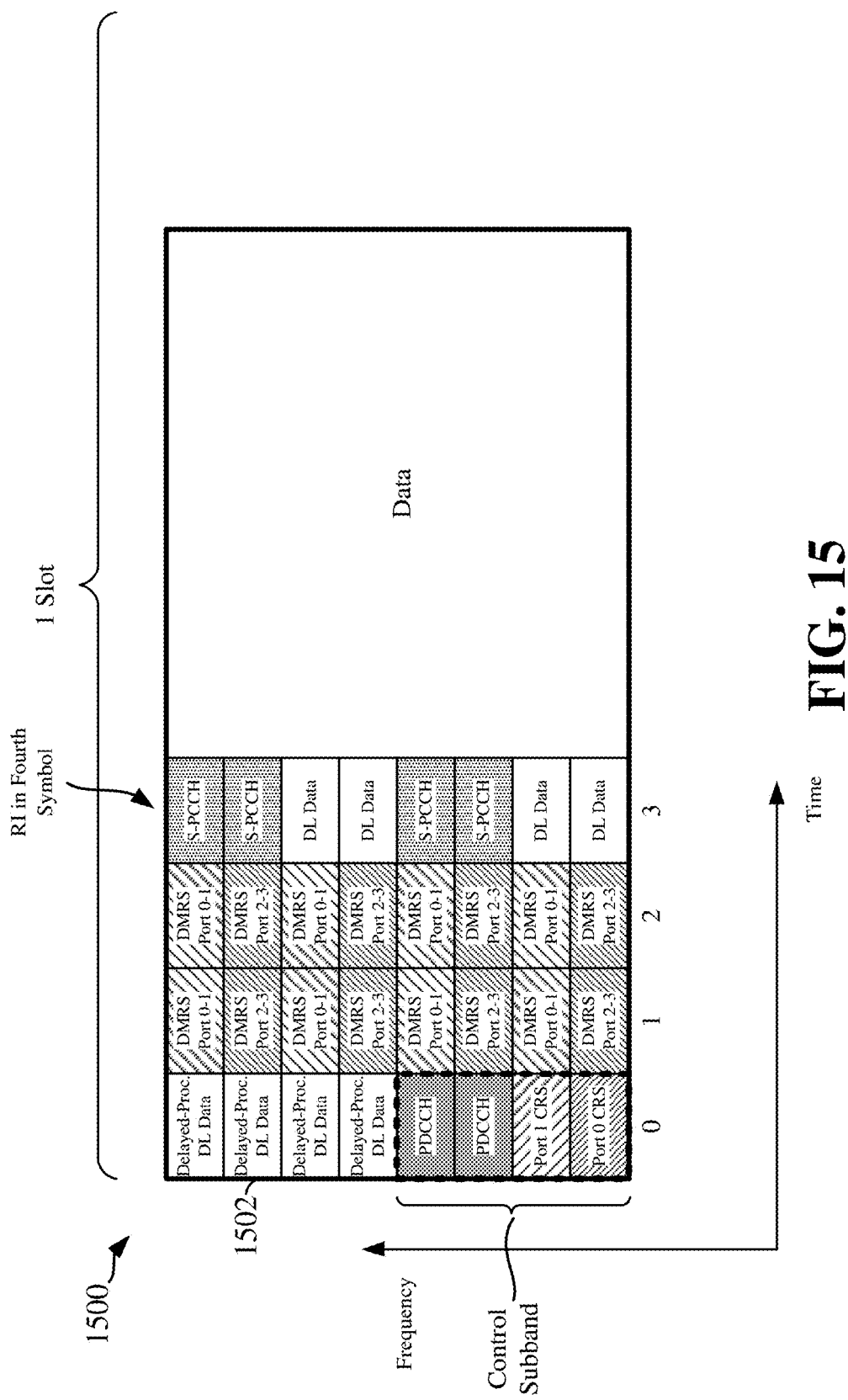
FIG. 15 is a schematic diagram illustrating a slot structure for a DL-centric slot according to another example.
Figure 16:
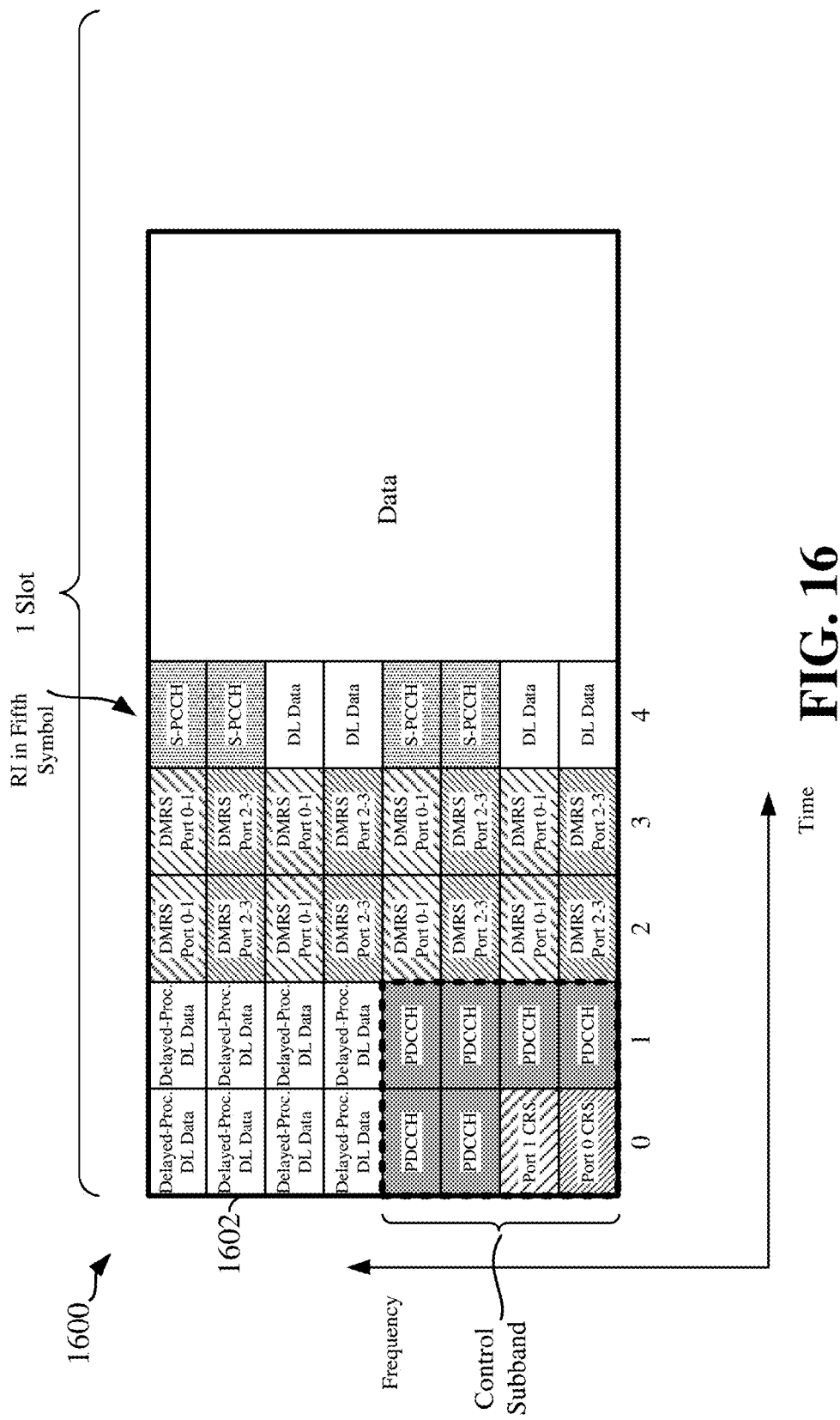
FIG. 16 is a schematic diagram illustrating a slot structure for a DL-centric slot according to another example.

FIG. 16 illustrates another example similar to FIG. 15, including a control subband that is FDM with delayed-processing DL data REs. However, in the example shown in FIG. 16, the control subband extends across the first two symbols of the slot (symbols 0 and 1) rather than being limited to a single symbol. By extending across two symbols, additional DCI may be provided by utilizing additional REs in the control resource set to carry the PDCCH. Of course, any suitable control channels and/or reference signals may be placed in the REs within the control subband.

In an aspect of the disclosure, a control subband or control resource set having a two-symbol duration may provide for a common DL control region utilized on both DL-centric slots and UL-centric slots in a TDD carrier, especially when utilizing self-contained slots. That is, to support a self-contained feature (see, e.g., the description above in relation to FIG. 6), a UL-centric slot may generally utilize a two-symbol control resource set. A UL grant generally arrives at a UE in the first symbol, and grant processing takes time. Further, the switching decision to change from receiving the DL control information and transmitting the UL data depends on the grant being decoded at the UE. Having this second control symbol provides time for the UE to process the UL grant. However, in some examples, rather than a two-symbol control region, the second symbol may simply be occupied by a gap, or padded by other DL channels. In any case, when both the UL-centric slots and DL-centric slots utilize a common DL control region with the same numbers of symbols, alignment of the DMRS in the DL- and UL-centric slots can improve the dynamic TDD performance.

In the example of FIG. 16, because the control resource set extends across two symbols, the DL data that is FDM with the control subband may also extend across two symbols (symbols 0 and 1). This DL data may be treated similar to the delayed-processing data described above and illustrated in FIG. 15. However, this slot structure provides for more data to be located in the symbols prior to the RI transmission (in this example, the fifth symbol (symbol 4). Therefore, this slot structure may rely on a scheduled entity that has sufficient peak processing power for the modem hardware for "catching up" on data symbols, and the memory for buffering samples of those data symbols. Otherwise, there may exist non-utilizable resources in the case of a single-interlace transmission mode.

Figure 17:
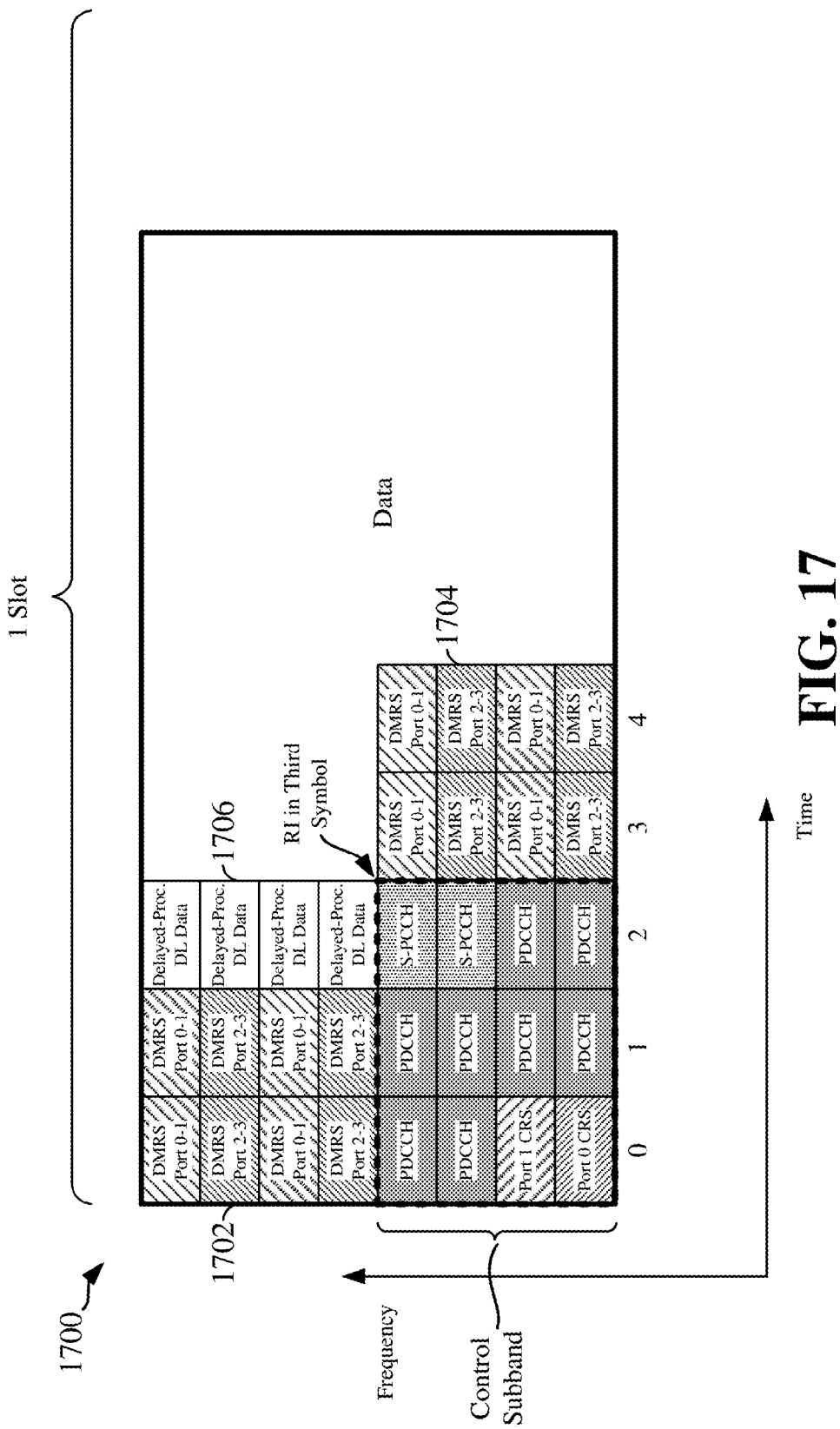
FIG. 17 is a schematic diagram illustrating a slot structure for a DL-centric slot according to another example.

FIG. 17 illustrates another example of a DL-centric slot 1700, including a control subband that is FDM with DMRS 1702. That is, in an aspect of the present disclosure, a slot 1700 may be structured such that the DMRS does not extend across the full system bandwidth of the slot 1700, or even across the entire bandwidth allocation for a given UE or scheduled entity. Rather, a slot 1700 may be structured with a first DMRS region 1702 that is FDM with the control subband (control resource set), and a second DMRS region 1704 that is time-division multiplexed (TDM) with the control resource set. In this way, a channel estimate may be determined across the full bandwidth based on the plural DMRS regions.

In this illustration, the control subband includes an S-PCCH, which may carry an RI. Here, because the S-PCCH is within the control subband, the S-PCCH may be CRS-based, utilizing the CRS carried, in this example, within the first symbol (symbol 0).

In a further aspect, delayed-processing data 1706 may be located within the third symbol (symbol 2), following the first DMRS region 1702. Here, because the delayed-processing data 1706 is carried in the same symbol as the RI, the delayed-processing data 1706 may be sampled and those samples may be buffered until the receiving UE or scheduled entity completes processing the RI, after which the UE may process the samples of the delayed-processing DL data.

As described above, if data symbols are transmitted before or concurrent to the transmission of the RI, samples of those data symbols may need to be buffered, since the receiving device lacks the sufficient information for processing the samples of those data symbols even after their last sample has arrived. That is, UE processing of the delayed-processing data depends on information that only becomes available later in time. This information may include DMRS symbol arrival and/or processing completion, RI information arrival and/or processing completion, etc.

Figure 18:
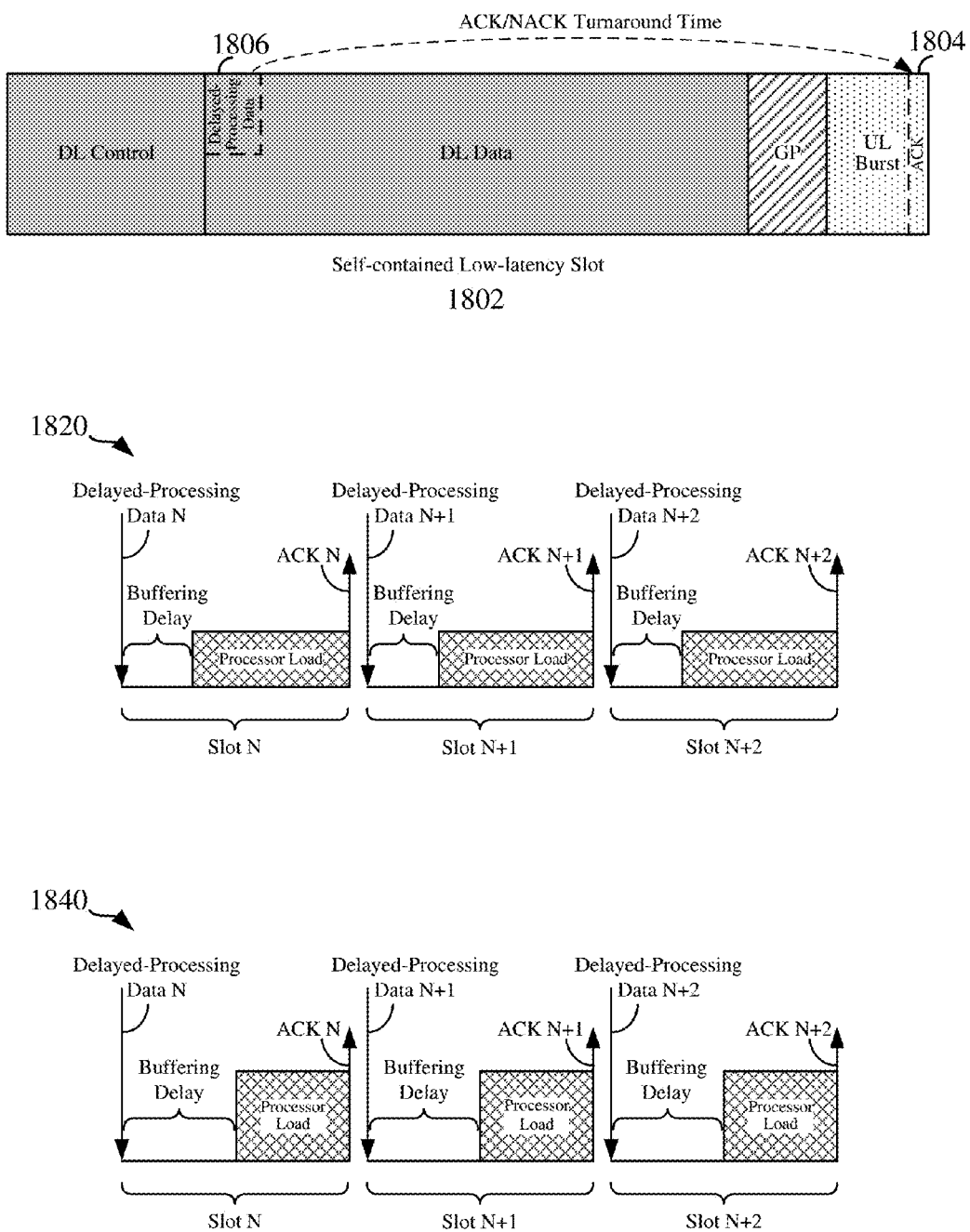
FIG. 18 is a schematic diagram illustrating differing processing loads caused by differing buffering delays according to some embodiments.

However, a desire for low-latency communication may result in a deadline for the UE to transmit one or more feedback bits based on the delayed-processing data, such as an ACK transmission. For example, as described above (see, e.g., FIG. 6), and as illustrated in FIG. 18, a self-contained slot 1802 may include a resource 1804 within an UL burst region reserved for an ACK transmission, for acknowledgment of the delayed-processing data bits 1806. The symbol or symbols that carry the RE or REs reserved for the ACK transmission may represent this deadline. That is, the UE must complete processing of the delayed-processing data 1806 before this deadline if the ACK transmission is to include the ACK/NACK bits corresponding to that data 1806.

When such a delay before the UE may begin processing the delayed-processing data 1806 occurs, the processing time can be substantially compressed relative to the full ACK/NACK turnaround time. FIG. 18 further includes schematic illustrations that show that a larger buffering delay for delayed-processing data 1806 can result in a higher processing load in order to meet this deadline for ACK transmission. In these illustrations, time is in the horizontal direction, and processing load is represented by the height of the hash-marked blocks in the vertical dimension. Here, the processing may include warm-up of tracking loops (e.g., automatic gain control, frequency tracking loops, or time tracking loops), demapping, demodulating, decoding, performing calculations based on the content of the data, or any other operations relating to determining the content of the delayed-processing data and/or utilizing that data.

Two timelines are illustrated: a first timeline 1820, with a relatively short buffering delay between receipt of delayed processing data and the beginning of UE processing of that data; and a second timeline 1840, with a relatively long buffering delay between receipt of delayed processing data and the beginning of UE processing of that data. In each slot, a UE makes up for a longer buffering delay with a higher processing load following the delay. If the processing load for processing the delayed-processing data is too high, this can cause a processing bottleneck, potentially causing the UE to fail to meet the ACK/NACK turnaround time, and/or causing other consequences to UE operation because the processing capabilities are inordinately allocated to processing the delayed-processing data. To reduce or minimize the required processing load for processing delayed-processing data, it is therefore desired to reduce or minimize the buffering delay.

According to an aspect of the present disclosure, the delayed-processing data 1806 may be encoded/modulated/precoded by the transmitter (here, for the DL-centric slot, the base station or scheduling entity) in a way that can reduce the processor load at the receiver (e.g., scheduled entity or UE). In this way, the receiving entity may more easily catch-up on the processing. For example, the transmitting entity may reduce the number of MIMO layers, may simplify the encoding and/or modulation, etc., for the delayed-processing data 1806. In another example, less data or fewer data symbols may be buffered by the receiving entity. In an aspect of this disclosure, because these techniques may be applied to data that is generally received toward the beginning of a slot, they may be referred to herein as payload pre-tapering.

According to various aspects of the present disclosure, any one or more payload pre-tapering algorithms (described further below) may be applied to data information in a DL-centric slot. In particular, such payload pre-tapering may be beneficially applied to delayed-processing data 1806, where data may be transmitted prior to or concurrent to a DMRS and/or an RI transmission.

For example, the REs that make up the delayed-processing data 1806 may be configured to include a reduced amount of data information relative to their capacity to carry data information. For example, in the example illustrated in FIG. 17, four REs are shown as including delayed-processing DL data. However, the content of a portion of the delayed-processing data 1806 may be filled with other channel information, including but not limited to loading the REs with CRS or other non-data-demod tones, e.g., reference signals, control (specific to this user), etc. It is noted, however, that the number of REs for such non-data REs may constitute just a small percentage of the resources within the region corresponding to the delayed-processing data 1806, and may be insufficient to fill the delayed processing data resources.

In another example, a base station or scheduling entity may configure the delayed-processing data 1806 with a lower modulation, or a smaller number of MIMO layers (i.e., a reduced rank). In this way, then the SNR requirement may be reduced or relaxed, and/or a dynamic range requirement may be reduced for the UE or scheduled entity to demodulate the data bits. In this way, more time may be gained for warm-up of tracking loops (e.g., automatic gain control, frequency tracking loops, or time tracking loops). Further, with a lower modulation and/or reduced number of MIMO layers, the demapper load corresponding to the delayed-processing data at the receiving UE or scheduled entity may be reduced. Here, the processing complexity typically scales superlinearly with an increasing number of MIMO layers, so potential timeline reduction could be very large.

In another example, payload tapering may be applied with an aim to reduce the load at the decoder, i.e., at the receiving UE or scheduled entity. For example, a lower coding rate may be used for the delayed-processing data 1806, resulting in fewer code blocks (CBs) and faster decoding. In some examples, decoding may be expedited by use of early termination, where the decoding process terminates before fully decoding the entire message, in a case where a highly redundant encoded message may be fully decoded based only on a portion of the coded message. In a further example, the base station or scheduling entity may employ a convolutional code for encoding the delayed-processing data 1806 if processing of that data is faster at the receiving UE or scheduled entity. Here, these examples may be supported as part of the MCS table. Of course, such an algorithm may be limited to instances where the hardware for decoding convolutionally coded data is already present at the receiving UE or scheduled entity.

In another example, padding or blanking (i.e. not carrying useful data for this UE or scheduled entity) may be applied at the resources that would otherwise be occupied by the delayed-processing data 1806.

When payload pre-tapering is utilized in any one or more of the examples described above, coordination between the scheduling entity and the scheduled entity may be utilized.

For example, the payload pre-tapering may apply to data symbols located in the first X data symbols in a slot. Here, X=0 may be considered a special case meaning no payload pre-tapering. A variety of options may exist for signaling the value of X between the scheduling entity and the scheduled entity. For example, a scheduled entity may signal the highest value of X that the processing capabilities of that device supports. As one example, a static value of X may be signaled utilizing a UE capabilities message. A semi-static value of X may be signaled utilizing RRC configuration signaling. A dynamic value of X may be signaled from the scheduling entity to the scheduled entity UE in the DCI (e.g., carried on the PDCCH and/or S-PCCH). Here, two or more of these signaling mechanisms may be utilized together: for example, a static signaling may be modified as needed by semi static and dynamic signaling.

A variety of factors may be utilized for determination of the value of X. For example, the value of X may be dependent on the buffering capability or processing capability (e.g., a peak processing capability) of the scheduled entity. In another example, the value of X may be dependent on the scheduling mode specific to the scheduled entity. For example, for a single-interlace transmission mode that includes an S-PCCH, X may be increased to cover a symbol transmitted concurrent to an RI. For example, with reference to FIG. 16, X=5 may be signaled to the scheduled entity. Here, X=5 indicates that not only is the data in the first two symbols 'tapered,' but additionally, data in the fifth symbol, symbol 4). Also, as described above, there may be an option to send no data (padding or other channel information, etc.) for symbols prior to the S-PCCH.

In some examples, the value of X may be dependent on the instantaneous DL assignment. That is, if the scheduling entity is performing only partial allocation of resource blocks, it may know that the scheduled entity is capable of catching up. In this example, payload pre-tapering may not be needed, and may not be used.

In a further aspect of the disclosure, the determination of which payload pre-tapering scheme to apply may be made according to a variety of factors. Most of the schemes for payload pre-tapering already have the parameters signaled dynamically through DCI, such as the number of layers, the MCS, etc. According to an aspect of the present disclosure, additional parameters may be included in the DCI for explicit signaling just for payload pre-tapering. Here, if pre-tapering with padding and/or channel fill (e.g. special reference signal to help with tracking loop warm-up) is used, all three levels of coordination (static, semi-static, dynamic) may be supported.

Scheduling Entity

Figure 19:
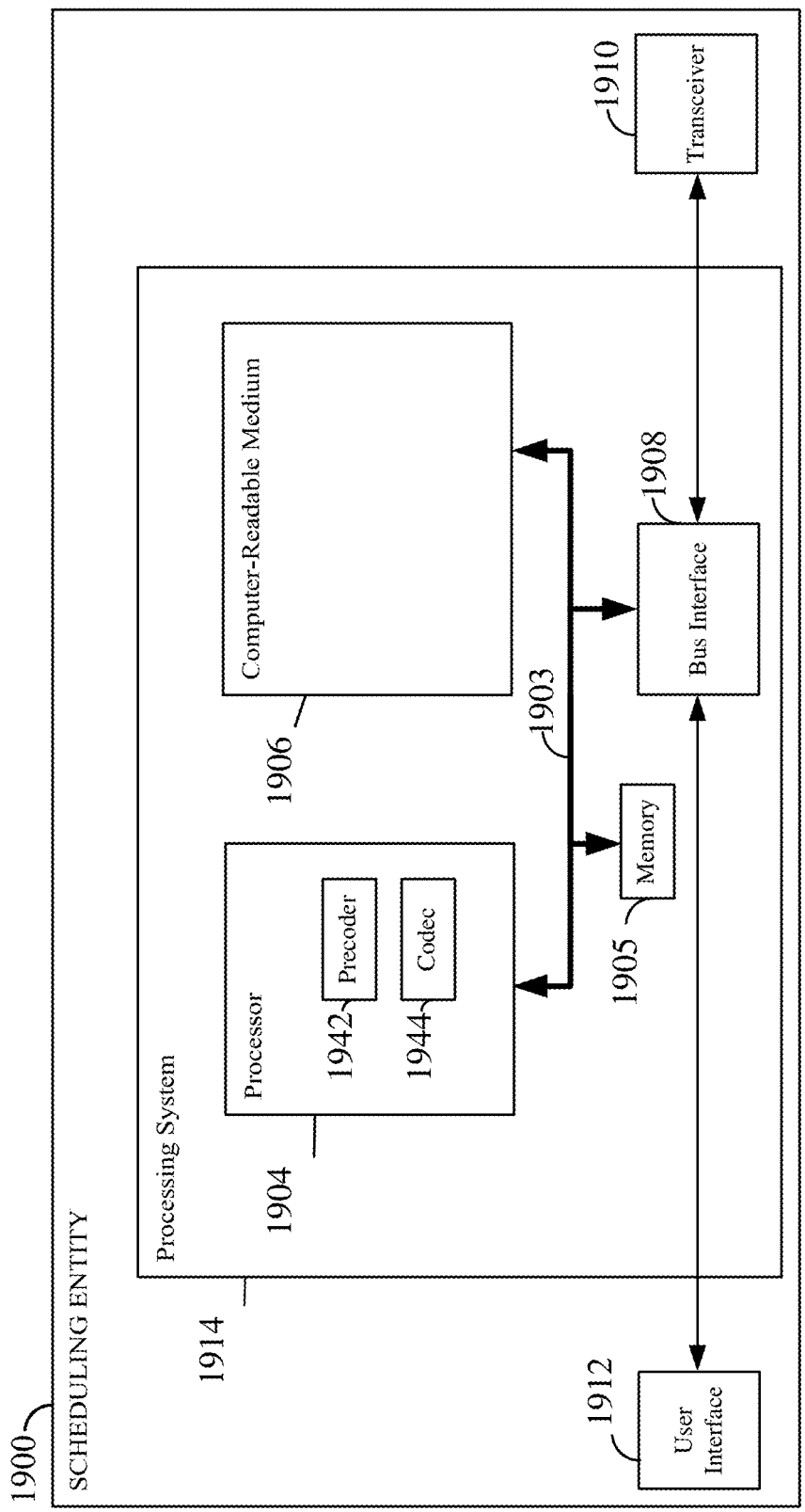
FIG. 19 is a block diagram illustrating an example of a hardware implementation for a scheduling entity employing a processing system.

FIG. 19 is a block diagram illustrating an example of a hardware implementation for a scheduling entity 1900 employing a processing system 1914. For example, the scheduling entity 1900 may be a user equipment (UE) as illustrated in FIGS. 1 and/or 2. In another example, the scheduling entity 1900 may be a base station as illustrated in FIGS. 1 and/or 2. In still another example, the scheduling entity 1900, or a portion thereof, may be either the transmitter 302 or the receiver 306 in FIG. 3.

The scheduling entity 1900 may be implemented with a processing system 1914 that includes one or more processors 1904. Examples of processors 1904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1900 may be configured to perform any one or more of the functions described herein.

In this example, the processing system 1914 may be implemented with a bus architecture, represented generally by the bus 1902. The bus 1902 may include any number of interconnecting buses and bridges depending on the specific application of the processing system 1914 and the overall design constraints. The bus 1902 communicatively couples together various circuits including one or more processors (represented generally by the processor 1904), a memory 1905, and computer-readable media (represented generally by the computer-readable medium 1906). The bus 1902 may also link various other circuits such as timing sources, peripherals, voltage regulators, and power management circuits, which are well known in the art, and therefore, will not be described any further. A bus interface 1908 provides an interface between the bus 1902 and a transceiver 1910. The transceiver 1910 provides a communication interface or means for communicating with various other apparatus over a transmission medium. Depending upon the nature of the apparatus, a user interface 1912 (e.g., keypad, display, speaker, microphone, joystick) may also be provided.

In some aspects of the disclosure, the processor 1904 may include precoder circuitry 1942 configured for various functions, including, for example, spatially precoding a data stream, e.g., by multiplying the stream with a precoding matrix to apply different amplitude weighting and phase shifting. Precoding a data stream can be utilized for beamforming, MIMO, MU-MIMO, SFBC, etc.

The processor 1904 may further include encoding/coding (codec) circuitry 1944 configured for various functions, including, for example, mathematically adding redundancy to an information message for forward error correction. The coding algorithm may utilize any suitable error correcting code including but not limited to low-density parity check (LDPC) codes, Polar codes, Turbo codes, etc. Such channel coding may be applied to any or all of the information in a downlink transmission from the scheduling entity 1900, including control information and user data.

The processor 1904 is responsible for managing the bus 1902 and general processing, including the execution of software stored on the computer-readable medium 1906. The software, when executed by the processor 1904, causes the processing system 1914 to perform the various functions described below for any particular apparatus. The computer-readable medium 1906 and the memory 1905 may also be used for storing data that is manipulated by the processor 1904 when executing software.

One or more processors 1904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1906. The computer-readable medium 1906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1906 may reside in the processing system 1914, external to the processing system 1914, or distributed across multiple entities including the processing system 1914. The computer-readable medium 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Scheduled Entity

Figure 20:
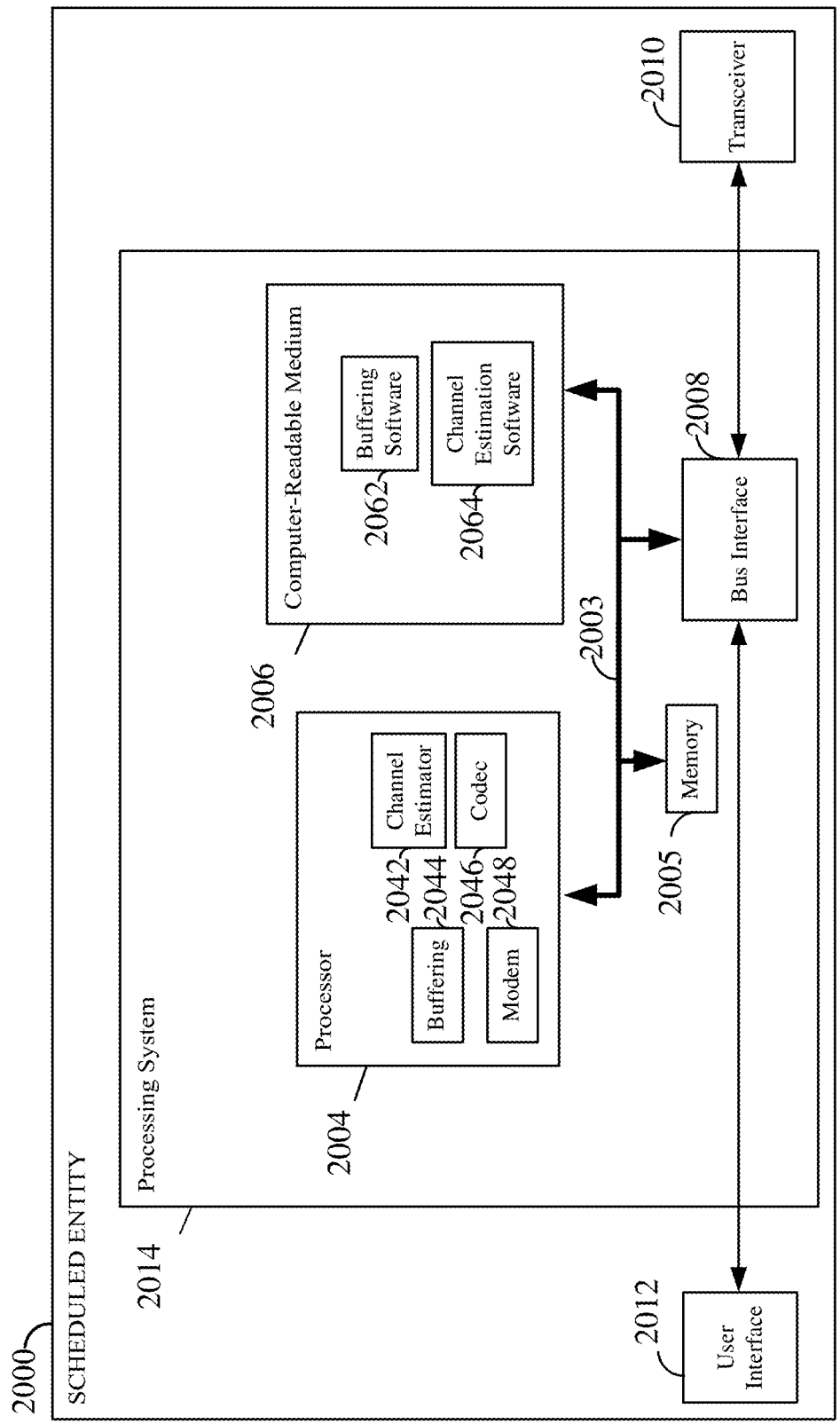
FIG. 20 is a block diagram illustrating an example of a hardware implementation for a scheduled entity employing a processing system.

FIG. 20 is a conceptual diagram illustrating an example of a hardware implementation for an exemplary scheduled entity 2000 employing a processing system 2014. In accordance with various aspects of the disclosure, an element, or any portion of an element, or any combination of elements may be implemented with a processing system 2014 that includes one or more processors 2004. For example, the scheduled entity 2000 may be a user equipment (UE) as described above and illustrated in FIGS. 1 and/or 2. In another example, the scheduled entity 2000, or a portion thereof, may be either the transmitter 302 or the receiver 306 in FIG. 3.

The processing system 2014 may be substantially the same as the processing system 1914 illustrated in FIG. 19, including a bus interface 2008, a bus 2002, memory 2005, a processor 2004, and a computer-readable medium 2006. Furthermore, the scheduled entity 2000 may include a user interface 2012 and a transceiver 2010 substantially similar to those described above in FIG. 19. That is, the processor 2004, as utilized in a scheduled entity 2000, may be used to implement any one or more of the processes described herein, such as the process illustrated in FIG. 21. Further, the processor 2004, as utilized in the scheduled entity 2000, may be utilized to receive and process downlink transmissions configured based on any one or more of the slots or carriers described herein, including but not limited to the slots illustrated in FIGS. 7-18.

In some aspects of the disclosure, the processor 2004 may include channel estimator circuitry 2042 configured for various functions, including, for example, generation of a channel estimate. Such a channel estimate may be based on one or more pilots or reference signals, including but not limited to a CRS and/or DMRS. The channel estimator circuitry 2042 may generate any suitable number of channel estimates, including one or more wideband estimates based on a wide span of reference signals, or narrowband estimates based on one reference signal, or a small set of reference signals. Further, the channel estimator circuitry 2042 may be configured to generate a plurality of channel estimates, corresponding to pilots or reference signals with different precoding, corresponding to different beams or MIMO layers. As described above, the channel estimate(s) may be utilized for, among other things, coherent demodulation/detection of control and/or data resource elements. For example, the channel estimator circuitry 2042 may be configured to implement one or more of the functions described below in relation to FIG. 21, including, e.g., block 2106 and/or 2108.

The processor 2004 may further include buffering circuitry 2044 configured for various functions, including, for example, buffering samples of received information (e.g., user data and/or delayed-processing data) for later processing. In some examples, the buffering circuitry 2044 may obtain samples of a received signal from the transceiver 2010 and store or buffer those samples in a buffer, which may reside in memory 2005, and/or computer-readable medium 2006. For example, the buffer circuitry 2044 may be configured to implement one or more of the functions described below in relation to FIG. 21, including, e.g., block 2104 and/or 2108.

The processor 2004 may further include encoder/decoder (codec) circuitry 2046 configured for various functions, including, for example, processing or decoding encoded information at a given code rate based on downlink control information (DCI) received from a scheduling entity. In some examples, the codec circuitry 2046 may be employed to decode buffered or delayed-processing data. For example, the codec circuitry 2046 may be configured to implement one or more of the functions described below in relation to FIG. 21, including, e.g., block 2106 and/or 2108.

The processor 2004 may further include modulation/demodulation (modem) circuitry 2048 configured for various functions, including, for example, processing or demodulating control and/or data channels within a received signal. In some examples, coherent demodulation may be employed with reference to a CRS and/or DMRS. For example, the modem circuitry 2048 may be configured to implement one or more of the functions described below in relation to FIG. 21, including, e.g., block 2106 and/or 2108.

Further, in one or more examples, the computer-readable storage medium 2006 may include buffering software 2062 configured for various functions, including, for example, buffering samples of received information (e.g., user data and/or delayed-processing data) for later processing. In some examples, the buffering software 2062 may obtain samples of a received signal from the transceiver 2010 and store or buffer those samples in a buffer, which may reside in memory 2005, and/or computer-readable medium 2006. For example, the buffer software 2062 may be configured to implement one or more of the functions described below in relation to FIG. 21, including, e.g., block 2104 and/or 2108.

The computer-readable medium 2006 may further include channel estimation software 2064 configured for various functions, including, for example, generation of a channel estimate. Such a channel estimate may be based on one or more pilots or reference signals, including but not limited to a CRS and/or DMRS. The channel estimation software 2064 may generate any suitable number of channel estimates, including one or more wideband estimates based on a wide span of reference signals, or narrowband estimates based on one reference signal, or a small set of reference signals. Further, the channel estimation software 2064 may be configured to generate a plurality of channel estimates, corresponding to pilots or reference signals with different precoding, corresponding to different beams or MIMO layers. As described above, the channel estimate(s) may be utilized for, among other things, coherent demodulation/detection of control and/or data resource elements. For example, the channel estimation software 2064 may be configured to implement one or more of the functions described below in relation to FIG. 21, including, e.g., block 2106 and/or 2108.

In one configuration, the scheduled entity 2000 includes means for receiving a downlink transmission and means for transmitting feedback. In one aspect, the aforementioned means may be the transceiver 2010 configured to perform the functions recited by the aforementioned means. In another aspect, the aforementioned means may be a circuit or any apparatus configured to perform the functions recited by the aforementioned means. The scheduled entity 2000 may further include means for demodulating resource elements, means for decoding encoded bits, and means for otherwise processing received downlink transmissions. In one aspect, the aforementioned means may be the processor 2004, the modem circuitry 2048, and/or the codec circuitry 2046 configured to perform the functions recited by the aforementioned means. In another aspect, the aforementioned means may be a circuit or any apparatus configured to perform the functions recited by the aforementioned means.

Figure 21:
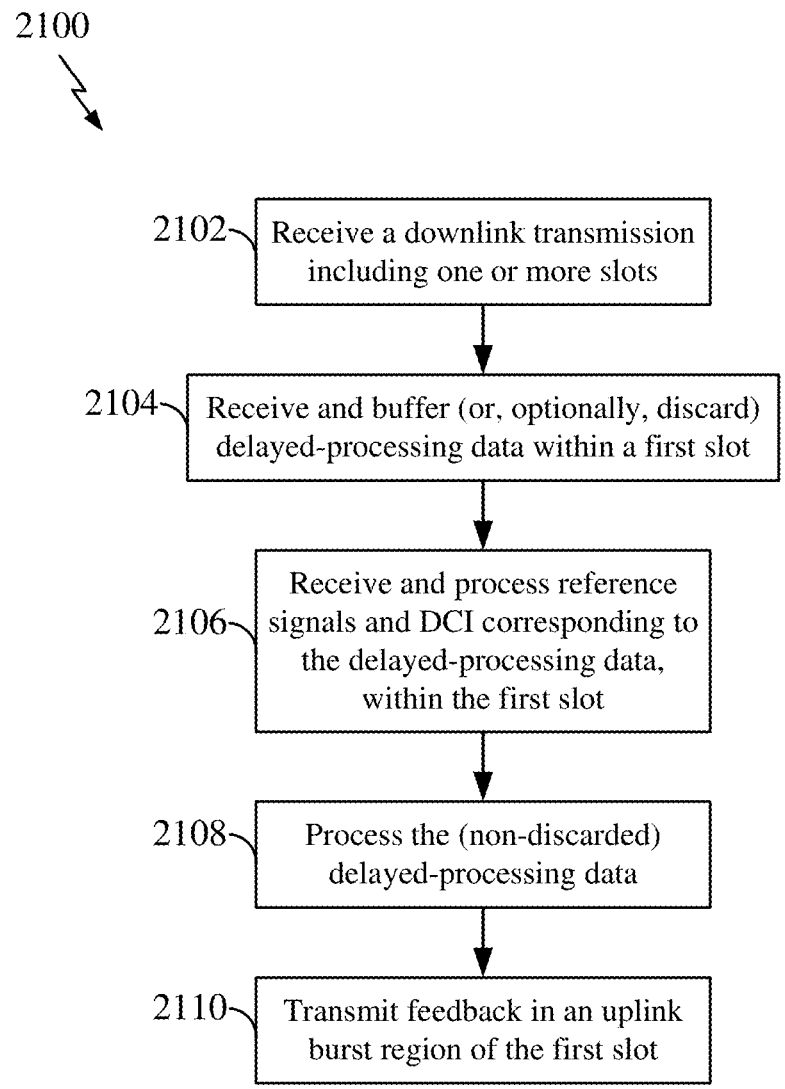
FIG. 21 is a flow chart illustrating an exemplary process for receiving and processing a downlink transmission according to some embodiments.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. 1, 2, 3, 19, and/or 20, and utilizing, for example, the processes and/or algorithms described herein in relation to FIG. 21.

FIG. 21 is a flow chart illustrating an exemplary process 2100 for receiving and processing a downlink transmission in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the scheduled entity 2000 illustrated in FIG. 20. In some examples, the process 2100 may be carried out by any suitable apparatus or means for carrying out the functions or algorithm described below.

At block 2102, the scheduled entity 2000 may receive a downlink transmission including a plurality of slots. In an aspect of the disclosure, the downlink transmission may correspond to a transmission on a TDD carrier, such that at least some of the plurality of slots may include at least a portion designated for transmissions in the uplink direction. That is, a downlink transmission may correspond, for example, to a transmission including DL-centric slots as described above and illustrated in FIG. 6. Here, one of the slots of the downlink transmission may include a control region (e.g., a control resource set or control subband) configured to carry downlink control information (DCI) and a control reference signal (CRS); and a data region multiplexed (e.g., time division multiplexed, frequency division multiplexed, space division multiplexed, or a combination of the above) with the control region and configured to carry user data and a demodulation reference signal (DMRS). Further, the slot may include either a second data region (e.g., for delayed-processing data; see, e.g., FIG. 15) or a second DMRS (see, e.g., FIG. 16), being frequency division multiplexed with the control region.

At block 2104, as part of the downlink transmission, the scheduled entity 2000 may receive and buffer (or, optionally discard) samples of delayed-processing data within the first slot. At block 2106, also as part of the downlink transmission, the scheduled entity 2000 may receive and process reference signals and DCI corresponding to the delayed-processing data, within the first slot. In some examples, the delayed-processing data received at block 2104 and the reference signals and/or DCI received in block 2106 may be located in the same symbol of the slot; while in other examples, the reference signals and/or DCI received in block 2106 may be located in a subsequent symbol later than the delayed-processing data received at block 2104.

At block 2108, in a case where the delayed-processing data was not discarded, the scheduled entity 2000 may retrieve the buffered samples and process the delayed-processing data. At block 2110, the scheduled entity may transmit feedback in an uplink burst region of the first slot. This feedback may include, for example, a HARQ ACK/NACK corresponding to the delayed-processing data and/or any other user data carried in the first slot. Also, in a non-self-contained slot, the feedback may include a HARQ ACK/NACK corresponding to data carried in a previous slot. The feedback may include any other suitable information, including but not limited to channel state feedback, a scheduling request, etc.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a scheduled entity to communicate wirelessly with a scheduling entity, the method comprising:
   receiving a downlink transmission, wherein a first slot of the downlink transmission comprises:
      a first control region configured to carry first downlink control information (DCI) and a control reference signal (CRS);
      a first data region multiplexed with the first control region and configured to carry first user data and a first demodulation reference signal (DMRS); and
      at least one of a second data region configured to carry second user data, or a second DMRS, frequency-division multiplexed (FDM) with the first control region; and
   transmitting, in an uplink burst region of the first slot, feedback based on at least one of the first DCI, the first user data, the second user data, the first DMRS, or the second DMRS, of the first slot.

2. The method of claim 1, wherein the first slot further comprises a second control region configured to carry second DCI, supplemental to the first DCI carried in the first control region.

3. The method of claim 2, wherein the second control region comprises a portion of the first control region, the method further comprising demodulating the second DCI based on the CRS.

4. The method of claim 3, wherein the second control region comprises a retransmission indicator (RI), and wherein the second control region is located, within the first slot, in a subsequent symbol later than an initial symbol of the first slot.

5. The method of claim 2, wherein the second control region comprises a portion of the first data region, the method further comprising demodulating the second DCI based on at least one of the first DMRS or the second DMRS.

6. The method of claim 5, wherein the second control region comprises a retransmission indicator (RI), and wherein the second control region is FDM with at least a portion of the first user data, the method further comprising:
   buffering samples of the portion of the first user data;
   processing the RI; and
   subsequent to the processing the RI, processing the buffered samples of the portion of first user data.

7. The method of claim 1, wherein the first slot comprises the second data region configured to carry the second user data, FDM with the first control region, and wherein the second user data comprises delayed-processing data, the method further comprising:
   buffering samples of the delayed-processing data until an occurrence of a predetermined event; and
   subsequent to the occurrence of the predetermined event, processing the samples of the delayed-processing data.

8. The method of claim 7, wherein the predetermined event comprises completion of processing of at least one of a DMRS or a retransmission indicator (RI) within the first slot.

9. The method of claim 8, further comprising:
   receiving the at least one of the DMRS or the RI in a symbol concurrent to or later than the second data region in the first slot.

10. The method of claim 1, wherein the first slot comprises the second data region configured to carry the second user data, FDM with the first control region, and wherein the second user data comprises delayed-processing data, the method further comprising:
   discarding the delayed-processing data based on the first slot being one among a plurality of slots scheduled based on a single-interlace transmission mode.

11. The method of claim 1,
   wherein the first data region, being configured to carry the first DMRS, comprises a first DMRS symbol carrying a DMRS for a first set of one or more multi-input multi-output (MIMO) ports, and a second DMRS symbol carrying a DMRS for a second set of one or more MIMO ports;

wherein the first data region, being configured to carry the first user data, comprises a first data symbol carrying user data for the first set of one or more MIMO ports, and a second data symbol carrying user data for the second set of one or more MIMO ports; and wherein the first and second DMRS symbols are interleaved with the first and second data symbols.

12. The method of claim 1, wherein the first slot comprises a plurality of symbols, and wherein the first user data or the second user data, when located within the initial X symbols of the slot, are pre-tapered, and wherein the pre-tapered first or second user data comprises at least one of:

user data with a reduced number of multi-input multi-output (MIMO) layers relative to subsequent user data located in a symbol of the slot subsequent to the initial X symbols of the slot;

user data with at least one of a lower modulation or a lower coding rate relative to subsequent user data located in a symbol of the slot subsequent to the initial X symbols of the slot;

a reduced amount of data information relative to a capacity of the first or second data regions to carry data information;

null resource elements; or combinations thereof.

13. The method of claim 12, further comprising receiving an indication of a value of X corresponding to the pre-tapered user data, from the scheduling entity.

14. The method of claim 12, wherein a value of X corresponding to the pre-tapered user data is based on at least one of:

a buffering capability of the scheduled entity;
a processing capability of the scheduled entity;
a scheduling mode of the scheduled entity;
an instantaneous downlink assignment for the scheduled entity; or combinations thereof.

15. A scheduled entity configured for wireless communication with a scheduling entity, the scheduled entity comprising:

a processor;
a transceiver communicatively coupled to the processor; and
a memory communicatively coupled to the processor,
wherein the processor is configured for:
receiving a downlink transmission, wherein a first slot of the downlink transmission comprises:
a first control region configured to carry first downlink control information (DCI) and a control reference signal (CRS);
a first data region multiplexed with the first control region and configured to carry first user data and a first demodulation reference signal (DMRS); and
at least one of a second data region configured to carry second user data, or a second DMRS, frequency-division multiplexed (FDM) with the first control region; and
transmitting, in an uplink burst region of the first slot, feedback based on at least one of the first DCI, the first user data, the second user data, the first DMRS, or the second DMRS, of the first slot.

16. The scheduled entity of claim 15, wherein the first slot further comprises a second control region configured to carry second DCI, supplemental to the first DCI carried in the first control region.

17. The scheduled entity of claim 16, wherein the second control region comprises a portion of the first control region, the method further comprising demodulating the second DCI based on the CRS.

18. The scheduled entity of claim 17, wherein the second control region comprises a retransmission indicator (RI), and wherein the second control region is located, within the first slot, in a subsequent symbol later than an initial symbol of the first slot.

19. The scheduled entity of claim 16, wherein the second control region comprises a portion of the first data region, the method further comprising demodulating the second DCI based on at least one of the first DMRS or the second DMRS.

20. The scheduled entity of claim 19, wherein the second control region comprises a retransmission indicator (RI), and wherein the second control region is FDM with at least a portion of the first user data, and wherein the processor is further configured for:
buffering samples of the portion of the first user data;
processing the RI; and
subsequent to the processing the RI, processing the buffered samples of the portion of first user data.

21. The scheduled entity of claim 15, wherein the first slot comprises the second data region configured to carry the second user data, FDM with the first control region, and wherein the second user data comprises delayed-processing data, and wherein the processor is further configured for:
buffering samples of the delayed-processing data until an occurrence of a predetermined event; and
subsequent to the occurrence of the predetermined event, processing the samples of the delayed-processing data.

22. The scheduled entity of claim 21, wherein the predetermined event comprises completion of processing of at least one of a DMRS or a retransmission indicator (RI) within the first slot.

23. The scheduled entity of claim 22, wherein the processor is further configured for:
receiving the at least one of the DMRS or the RI in a symbol concurrent to or later than the second data region in the first slot.

24. The scheduled entity of claim 15, wherein the first slot comprises the second data region configured to carry the second user data, FDM with the first control region, and wherein the second user data comprises delayed-processing data, and wherein the processor is further configured for discarding the delayed-processing data based on the first slot being one among a plurality of slots scheduled based on a single-interlace transmission mode.

25. The scheduled entity of claim 15,
wherein the first data region, being configured to carry the first DMRS, comprises a first DMRS symbol carrying a DMRS for a first set of one or more multi-input multi-output (MIMO) ports, and a second DMRS symbol carrying a DMRS for a second set of one or more MIMO ports;

wherein the first data region, being configured to carry the first user data, comprises a first data symbol carrying user data for the first set of one or more MIMO ports, and a second data symbol carrying user data for the second set of one or more MIMO ports; and wherein the first and second DMRS symbols are interleaved with the first and second data symbols.

26. The scheduled entity of claim 15, wherein the first slot comprises a plurality of symbols, and
 wherein the first user data or the second user data, when located within the initial X symbols of the slot, are pre-tapered, and wherein the pre-tapered first or second user data comprises at least one of:
  user data with a reduced number of multi-input multi-output (MIMO) layers relative to subsequent user data located in a symbol of the slot subsequent to the initial X symbols of the slot;
  user data with at least one of a lower modulation or a lower coding rate relative to subsequent user data located in a symbol of the slot subsequent to the initial X symbols of the slot;
  a reduced amount of data information relative to a capacity of the first or second data regions to carry data information;
  null resource elements; or combinations thereof.

27. The scheduled entity of claim 26, further comprising receiving an indication of a value of X corresponding to the pre-tapered user data, from the scheduling entity.

28. The scheduled entity of claim 26, wherein a value of X corresponding to the pre-tapered user data is based on at least one of:
 a buffering capability of the scheduled entity;
 a processing capability of the scheduled entity;
 a scheduling mode of the scheduled entity;
 an instantaneous downlink assignment for the scheduled entity; or combinations thereof.

29. A scheduled entity configured for wireless communication with a scheduling entity, the scheduled entity comprising:
 means for receiving a downlink transmission, wherein a first slot of the downlink transmission comprises:
  a first control region configured to carry first downlink control information (DCI) and a control reference signal (CRS);
  a first data region multiplexed with the first control region and configured to carry first user data and a first demodulation reference signal (DMRS); and
  at least one of a second data region configured to carry second user data, or a second DMRS, frequency-division multiplexed (FDM) with the first control region; and
 means for transmitting, in an uplink burst region of the first slot, feedback based on at least one of the first DCI, the first user data, the second user data, the first DMRS, or the second DMRS, of the first slot.

30. A non-transitory computer readable medium storing computer executable code, comprising instructions for causing a scheduled entity to:
 receive a downlink transmission from a scheduling entity, wherein a first slot of the downlink transmission comprises:
  a first control region configured to carry first downlink control information (DCI) and a control reference signal (CRS);
  a first data region multiplexed with the first control region and configured to carry first user data and a first demodulation reference signal (DMRS); and
  at least one of a second data region configured to carry second user data, or a second DMRS, frequency-division multiplexed (FDM) with the first control region; and
 transmit, in an uplink burst region of the first slot, feedback based on at least one of the first DCI, the first user data, the second user data, the first DMRS, or the second DMRS, of the first slot.

31. A method for a scheduling entity to communicate wirelessly with one or more scheduled entities, the method comprising:
 transmitting a downlink transmission, wherein a first slot of the downlink transmission comprises:
  a first control region configured to carry first downlink control information (DCI) and a control reference signal (CRS);
  a first data region multiplexed with the first control region and configured to carry first user data and a first demodulation reference signal (DMRS); and
  at least one of a second data region configured to carry second user data, or a second DMRS, frequency-division multiplexed (FDM) with the first control region; and
 receiving, in an uplink burst region of the first slot, feedback based on at least one of the first DCI, the first user data, the second user data, the first DMRS, or the second DMRS, of the first slot.

32. The method of claim 31, wherein the first slot further comprises a second control region configured to carry second DCI, supplemental to the first DCI carried in the first control region.

33. The method of claim 32, wherein the second control region comprises a portion of the first control region, the method further comprising configuring the second DCI to be demodulated based on the CRS.

34. The method of claim 33, wherein the second control region comprises a retransmission indicator (RI), and wherein the second control region is located, within the first slot, in a subsequent symbol later than an initial symbol of the first slot.

35. The method of claim 32, wherein the second control region comprises a portion of the first data region, the method further comprising configuring the second DCI to be demodulated based on at least one of the first DMRS or the second DMRS.

36. The method of claim 35, wherein the second control region comprises a retransmission indicator (RI), and wherein the second control region is FDM with at least a portion of the first user data.

37. The method of claim 31, wherein the first slot comprises the second data region configured to carry the second user data, FDM with the first control region, and wherein the second user data comprises delayed-processing data.

38. The method of claim 37, further comprising:
 transmitting at least one of a DMRS or a RI in a symbol concurrent to or later than the second data region in the first slot.

39. The method of claim 31, wherein the first slot comprises the second data region configured to carry the second user data, FDM with the first control region, and wherein the second user data comprises delayed-processing data, the method further comprising:
 transmitting the first slot as one among a plurality of slots scheduled based on a single-interlace transmission mode.

40. The method of claim 31,
 wherein the first data region, being configured to carry the first DMRS, comprises a first DMRS symbol carrying a DMRS for a first set of one or more multi-input multi-output (MIMO) ports, and a second DMRS symbol carrying a DMRS for a second set of one or more MIMO ports;

wherein the first data region, being configured to carry the first user data, comprises a first data symbol carrying user data for the first set of one or more MIMO ports, and a second data symbol carrying user data for the second set of one or more MIMO ports; and wherein the first and second DMRS symbols are interleaved with the first and second data symbols.

41. The method of claim 31, wherein the first slot comprises a plurality of symbols, the method further comprising:
pre-tapering the first user data or the second user data, when located within the initial X symbols of the slot, wherein the pre-tapered first or second user data comprises at least one of:
user data with a reduced number of multi-input multi-output (MIMO) layers relative to subsequent user data located in a symbol of the slot subsequent to the initial X symbols of the slot;
user data with at least one of a lower modulation or a lower coding rate relative to subsequent user data located in a symbol of the slot subsequent to the initial X symbols of the slot;
a reduced amount of data information relative to a capacity of the first or second data regions to carry data information;
null resource elements; or combinations thereof.

42. The method of claim 41, further comprising transmitting an indication of a value of X corresponding to the pre-tapered user data.

43. The method of claim 41, wherein a value of X corresponding to the pre-tapered user data is based on at least one of:
a buffering capability of the scheduled entity;
a processing capability of the scheduled entity;
a scheduling mode of the scheduled entity;
an instantaneous downlink assignment for the scheduled entity; or combinations thereof.

44. A scheduling entity configured to communicate wirelessly with one or more scheduled entities, comprising:
a processor;
a transceiver communicatively coupled to the processor; and
a memory communicatively coupled to the processor,
wherein the processor is configured for:
transmitting a downlink transmission via the transceiver, wherein a first slot of the downlink transmission comprises:
a first control region configured to carry first downlink control information (DCI) and a control reference signal (CRS);
a first data region multiplexed with the first control region and configured to carry first user data and a first demodulation reference signal (DMRS); and
at least one of a second data region configured to carry second user data, or a second DMRS, frequency-division multiplexed (FDM) with the first control region; and
receiving, via the transceiver, in an uplink burst region of the first slot, feedback based on at least one of the first DCI, the first user data, the second user data, the first DMRS, or the second DMRS, of the first slot.

45. The method of claim 44, wherein the first slot further comprises a second control region configured to carry second DCI, supplemental to the first DCI carried in the first control region.

46. The method of claim 45, wherein the second control region comprises a portion of the first control region, the method further comprising configuring the second DCI to be demodulated based on the CRS.

47. The method of claim 46, wherein the second control region comprises a retransmission indicator (RI), and wherein the second control region is located, within the first slot, in a subsequent symbol later than an initial symbol of the first slot.

48. The method of claim 45, wherein the second control region comprises a portion of the first data region, the method further comprising configuring the second DCI to be demodulated based on at least one of the first DMRS or the second DMRS.

49. The method of claim 48, wherein the second control region comprises a retransmission indicator (RI), and wherein the second control region is FDM with at least a portion of the first user data.

50. The method of claim 44, wherein the first slot comprises the second data region configured to carry the second user data, FDM with the first control region, and wherein the second user data comprises delayed-processing data.

51. The method of claim 50, further comprising:
transmitting at least one of a DMRS or a RI in a symbol concurrent to or later than the second data region in the first slot.

52. The method of claim 44, wherein the first slot comprises the second data region configured to carry the second user data, FDM with the first control region, and wherein the second user data comprises delayed-processing data, the method further comprising:
transmitting the first slot as one among a plurality of slots scheduled based on a single-interlace transmission mode.

53. The method of claim 44,
wherein the first data region, being configured to carry the first DMRS, comprises a first DMRS symbol carrying a DMRS for a first set of one or more multi-input multi-output (MIMO) ports, and a second DMRS symbol carrying a DMRS for a second set of one or more MIMO ports;
wherein the first data region, being configured to carry the first user data, comprises a first data symbol carrying user data for the first set of one or more MIMO ports, and a second data symbol carrying user data for the second set of one or more MIMO ports; and
wherein the first and second DMRS symbols are interleaved with the first and second data symbols.

54. The method of claim 44, wherein the first slot comprises a plurality of symbols, the method further comprising:
pre-tapering the first user data or the second user data, when located within the initial X symbols of the slot, wherein the pre-tapered first or second user data comprises at least one of:
user data with a reduced number of multi-input multi-output (MIMO) layers relative to subsequent user data located in a symbol of the slot subsequent to the initial X symbols of the slot;
user data with at least one of a lower modulation or a lower coding rate relative to subsequent user data located in a symbol of the slot subsequent to the initial X symbols of the slot;
a reduced amount of data information relative to a capacity of the first or second data regions to carry data information;
null resource elements; or combinations thereof.

55. The method of claim 54, further comprising transmitting an indication of a value of X corresponding to the pre-tapered user data.

56. The method of claim 54, wherein a value of X corresponding to the pre-tapered user data is based on at least one of:
   a buffering capability of the scheduled entity;
   a processing capability of the scheduled entity;
   a scheduling mode of the scheduled entity;
   an instantaneous downlink assignment for the scheduled entity; or combinations thereof.

\* \* \* \* \*